(12) United States Patent
Fang et al.

(10) Patent No.: US 12,301,830 B2
(45) Date of Patent: May 13, 2025

(54) SYSTEMS AND METHODS FOR VIDEO PROCESSING

(71) Applicant: ZHEJIANG DAHUA TECHNOLOGY CO., LTD., Zhejiang (CN)

(72) Inventors: Cheng Fang, Hangzhou (CN); Dong Jiang, Hangzhou (CN); Xue Zhang, Hangzhou (CN); Yao Chen, Hangzhou (CN); Jucai Lin, Hangzhou (CN); Jun Yin, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 46 days.

(21) Appl. No.: 18/327,874

(22) Filed: Jun. 1, 2023

(65) Prior Publication Data

US 2023/0319288 A1 Oct. 5, 2023

Related U.S. Application Data

(63) Continuation of application No. PCT/CN2021/135660, filed on Dec. 6, 2021.

(30) Foreign Application Priority Data

Dec. 6, 2020 (CN) .......................... 202011419569.3
Feb. 22, 2021 (CN) .......................... 202110199496.X

(51) Int. Cl.
*H04N 19/147* (2014.01)
*H04N 19/50* (2014.01)

(52) U.S. Cl.
CPC ........... *H04N 19/147* (2014.11); *H04N 19/50* (2014.11)

(58) Field of Classification Search
CPC .... H04N 19/147; H04N 19/50; H04N 19/103; H04N 19/105; H04N 19/129; H04N 19/146; H04N 19/176
See application file for complete search history.

(56) References Cited

U.S. PATENT DOCUMENTS

2015/0381994 A1 12/2015 Yu et al.
2016/0330455 A1 11/2016 Lin et al.
(Continued)

FOREIGN PATENT DOCUMENTS

CN 104159123 A 11/2014
CN 104244007 A * 12/2014
(Continued)

OTHER PUBLICATIONS

Lin, Tao et al., Screen Content Coding with Primary and Secondary Reference Buffers for String Matching and Copying, Research Papers, 53-60 , 2015 (Year: 2015).*

(Continued)

*Primary Examiner* — Dramos Kalapodas
(74) *Attorney, Agent, or Firm* — METIS IP LLC

(57) ABSTRACT

The present disclosure relates to systems and methods for video encoding. The systems may determine a current string in a coding unit (CU) of an image frame. The current string may include one or more pixels. The systems may determine a first cost based on pixels with a same pixel value in the current string. The systems may determine a second cost based on one or more strings that are located above the current string. The systems may further determine a prediction string of the current string based on the first cost and the second cost. To determine the prediction string of the current string based on the first cost and the second cost, the systems may designate the current string as the prediction string of (Continued)

the current string in response to that the first cost and the second cost are not determined.

20 Claims, 9 Drawing Sheets

(56) References Cited

U.S. PATENT DOCUMENTS

| | | |
|---|---|---|
| 2017/0054988 A1 | 2/2017 | Lin et al. |
| 2018/0160141 A1 | 6/2018 | He et al. |
| 2019/0110079 A1 | 4/2019 | Lin et al. |
| 2019/0182490 A1 | 6/2019 | Lee et al. |
| 2022/0417504 A1 | 12/2022 | Wang et al. |
| 2023/0047433 A1* | 2/2023 | Wang .................... H04N 19/105 |

FOREIGN PATENT DOCUMENTS

| | | | | |
|---|---|---|---|---|
| CN | 107770540 A | | 3/2018 | |
| CN | 110087090 A | | 8/2019 | |
| CN | 111614359 A | | 9/2020 | |
| CN | 112055219 A | | 12/2020 | |
| CN | 112073719 A | | 12/2020 | |
| CN | 112565749 A | | 3/2021 | |
| CN | 112995661 A | | 6/2021 | |
| CN | 113099269 A | | 7/2021 | |
| CN | 112995661 B | | 8/2021 | |
| CN | 114390289 A | * | 4/2022 | |
| GB | 2527354 A | * | 12/2015 | ........... H04N 19/517 |
| JP | 2017073668 A | | 4/2017 | |
| KR | 20140127385 A | | 11/2014 | |
| WO | WO-2015200690 A1 | * | 12/2015 | ........... H04N 19/105 |

OTHER PUBLICATIONS

Zhao, Liping et al., A Universal String Matching Approach to Screen Content Coding, ieee Transactions on Multimedia, 20: 796-809, 2018 (Year: 2018).*

Zhou, Kailun et al., A Flexible and Uniform String Matching Technique for General Screen Content Coding, Multimed Tools Appl, 77: 23751-23775, 2018 (Year: 2018).*

The Extended European Search Report in European Application No. 21900126.0 mailed on Apr. 5, 2024, 17 pages.

Zhao, Liping et al., An Intra String Copy Approach for SCC in AVS3, 2021 International Conference on Visual Communications and Image Processing (VCIP), 2021, 5 pages.

Pu, Wei et al., Palette Mode Coding in HEVC Screen Content Coding Extension, IEEE Journal on Emerging and Selected Topics in Circuits and Systems, 6(4): 420-432, 2016.

Xu, Xiaozhong et al., VCIP 2020 Tutorial: Screen Content Coding in Recently Developed Video Coding Standards, 2020 IEEE International Conference on Visual Communications and Image Processing (VCIP), 2020, 56 pages.

International Search Report in PCT/CN2021/135660 mailed on Feb. 18, 2022, 4 pages.

Written Opinion in PCT/CN2021/135660 mailed on Feb. 18, 2022, 5 pages.

Notification to Grant Patent Right for Invention in Chinese Application No. 202011419569.3 mailed on Jun. 6, 2022, 8 pages.

Telecommunication Standardization Sector of ITU, ITU-T H.265, 2015, 635 pages.

"YUV Color Coding Analysis", Web page <https://www.jianshu.com/p/a91502c00fb0>, Oct. 16, 2016.

"Third Generation AVS Standard", Web page <http://www.avs.org.cn/index/list?catid=9>, 2017.

"Ultra HD AVS3 Encoding", Web page <https://zhuanlan.zhihu.com/p/386907721>, Jul. 5, 2021.

Zhao, Liping et al., Pixel String Matching for Full-Chroma Screen and Mixed Content Coding in AVS2, Chinese Journal of Computers, 2018, 14 pages.

* cited by examiner

600

SYSTEMS AND METHODS FOR VIDEO PROCESSING

CROSS-REFERENCE TO RELATED APPLICATIONS

This application is a Continuation of International Application No. PCT/CN2021/135660 filed on Dec. 6, 2021, which claims priority to Chinese Patent Application No. 202011419569.3, filed on Dec. 6, 2020, Chinese Patent Application No. 202110199496.X, filed on Feb. 22, 2021, the contents of each of which are incorporated herein by reference in their entirety.

TECHNICAL FIELD

The present disclosure relates to video data processing technology, and in particular, to systems and methods for video encoding.

BACKGROUND

A video may be compressed using video encoding technology to reduce amount of video data, a network bandwidth, a storage space in the transmission of the video, etc. In present string prediction for video encoding, for example, equal value string unit basis vector string (evs_ubvs) prediction, an equal value string (evs) can only be predicted with a (0, −1) vector, which is too single. A unit basis vector string (ubvs) may cross pixel rows, so that an in-string reference may be performed on the ubvs, which is not conducive to hardware implementation. String lengths of different strings (e.g., the evs, the ubvs) are uncertain, which is not conducive to the hardware implementation and greatly increases the complexity of the hardware implementation. In addition, different strings are encoded based on their actual string lengths, so that a count of bits of the encoding is large.

Therefore, it is desirable to provide systems and methods for video processing, which may improve compression performance and reduce distortion, thereby improving the quality of the video encoding.

SUMMARY

An aspect of the present disclosure relates to a method for video encoding. The method may include determining a current string in a coding unit (CU) of an image frame. The current string may include one or more pixels. The method may include determining a first cost based on pixels with a same pixel value in the current string. The method may include determining a second cost based on one or more strings that are located above the current string. The method may further include determining a prediction string of the current string based on the first cost and the second cost. The determining the prediction string of the current string based on the first cost and the second cost may include designating the current string as the prediction string of the current string in response to that the first cost and the second cost are not determined.

In some embodiments, the determining the second cost based on the one or more strings that are located above the current string may include comparing the current string with the one or more strings that are pointed to by a plurality of preset vectors, a count of the one or more strings being larger than 1; determining, based on the comparison, a target string from the one or more strings; and designating a cost of the target string as the second cost.

In some embodiments, the count of the one or more strings may be obtained by mapping a height of the CU based on a preset mapping relationship. The preset mapping relationship may include a multiple linear relationship or a nonlinear relationship.

In some embodiments, the method may further include designating two adjacent strings among strings that have been predicted in the CU and satisfy a condition as a pair of target strings; determining one or more fusion prediction strings by fusing the pair of target strings based on prediction strings of the pair of target strings and a fusion degree, the fusion degree including at least one of complete fusion or incomplete fusion; and determining one or more target prediction strings of the pair of target strings based on prediction costs of the prediction strings of the pair of target strings and prediction costs of the one or more fusion prediction strings.

In some embodiments, the determining the one or more fusion prediction strings by fusing the pair of target strings based on the prediction strings of the pair of target strings and the fusion degree may include, determining, in response to styles of the prediction strings of the pair of target strings being the same, one fusion prediction string by fusing the pair of target strings based on the complete fusion.

In some embodiments, the determining the one or more fusion prediction strings by fusing the pair of target strings based on the prediction strings of the pair of target strings and the fusion degree may include determining, in response to styles of the prediction strings of the pair of target strings being different, two fusion prediction strings by fusing the pair of target strings based on the incomplete fusion.

In some embodiments, the current string may be determined by setting a length of the current string being an integer multiple of a reference value. The reference value may be a natural number larger than 1.

In some embodiments, the determining the current string may include determining the current string by increasing a length of the current string to the integer multiple of the reference value.

In some embodiments, the determining the current string may include determining the current string by reducing a length of the current string to the integer multiple of the reference value.

In some embodiments, the determining the current string may include determining the current string based on a style of the current string. The style may include one of unmatched pixels, an equal value string (evs), and a unit basis vector string (ubvs) determined based on a plurality of preset vectors.

In some embodiments, the style of the current string may be the unmatched pixels. The determining the current string based on the style of the current string may include determining the current string by increasing unmatched pixels in the current string.

In some embodiments, the style of the current string may be the evs or the ubvs determined based on the plurality of preset vectors. The determining the current string based on the style of the current string may include determining the current string by reducing a length of the evs or the ubvs to the integer multiple of the reference value.

In some embodiments, the determining the prediction string of the current string based on the first cost and the second cost may include comparing the first cost and the second cost, and determining the predicted string of the current string based on the comparison.

In some embodiments, the method may further include obtaining an encoded string corresponding to the current string, and encoding the encoded string based on the prediction string of the current string. The encoding the encoded string based on the prediction string of the current string may include obtaining, in response to that a type of the prediction string is ubvs, a pixel row spacing corresponding to a prediction vector of the prediction string and a count of pixel rows occupied by the prediction string; dividing, in response to that the count of pixel rows occupied by the prediction string is greater than the pixel row spacing corresponding to the prediction vector of the prediction string, the prediction string into a plurality of sub prediction strings, a count of pixel rows occupied by each of the plurality of sub prediction strings being greater than the pixel row spacing; decoding the plurality of sub prediction strings in turn.

A further aspect of the present disclosure relates to a system for video encoding. The system may include at least one storage device including a set of instructions and at least one processor in communication with the at least one storage device. When executing the set of instructions, the at least one processor may be directed to cause the system to implement operations. The operations may include determining a current string in a coding unit (CU) of an image frame. The current string may include one or more pixels. The operations may include determining a first cost based on pixels with a same pixel value in the current string. The operations may include determining a second cost based on one or more strings that are located above the current string. The operations may further include determining a prediction string of the current string based on the first cost and the second cost. The determining the prediction string of the current string based on the first cost and the second cost may include designating the current string as the prediction string of the current string in response to that the first cost and the second cost are not determined.

A still further aspect of the present disclosure relates to a system for video encoding. The system may include a determination module, a first cost determination module, a second cost determination module, and a prediction module. The determination module may be configured to determine a current string in a coding unit (CU) of an image frame, the current string including one or more pixels. The first cost determination module may be configured to determine a first cost based on pixels with a same pixel value in the current string. The second cost determination module may be configured to determine a second cost based on one or more strings that are located above the current string. The prediction module may be configured to determine a prediction string of the current string based on the first cost and the second cost. To determine the prediction string of the current string based on the first cost and the second cost, the prediction module may be configured to designate the current string as the prediction string of the current string in response to that the first cost and the second cost are not determined.

A still further aspect of the present disclosure relates to a non-transitory computer readable medium including executable instructions. When the executable instructions are executed by at least one processor, the executable instructions may direct the at least one processor to perform a method. The method may include determining a current string in a coding unit (CU) of an image frame. The current string may include one or more pixels. The method may include determining a first cost based on pixels with a same pixel value in the current string. The method may include determining a second cost based on one or more strings that are located above the current string. The method may further include determining a prediction string of the current string based on the first cost and the second cost. The determining the prediction string of the current string based on the first cost and the second cost may include designating the current string as the prediction string of the current string in response to that the first cost and the second cost are not determined.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
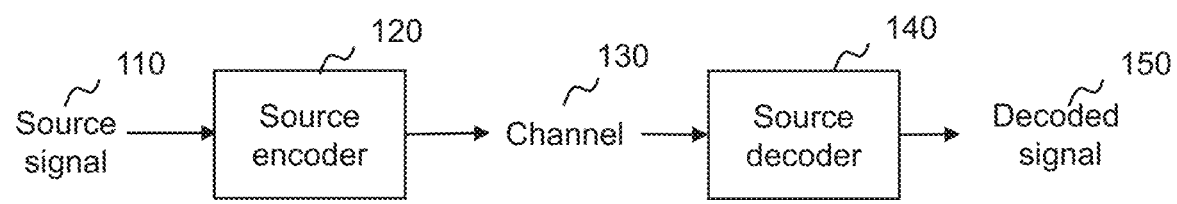
FIG. 1 is a schematic diagram illustrating an exemplary video processing process according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It should be understood that the term "encoding unit," "current block," "encoding block," or "block," used herein refer to a basic unit of image processing or a specific position in an image and are used interchangeably. In addition, in the description of the present disclosure, the term "unit" includes all concepts of encoding unit, prediction unit, and transformation unit.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

Generally, the words "module," "unit," or "block" used herein, refer to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, an engine, a module, or a block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used for the purpose of differentiation, and cannot be interpreted as indicating or implying relative importance, nor can be understood as indicating or implying the order.

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts. One or more operations may be removed from the flowcharts.

FIG. 1 is a schematic diagram illustrating an exemplary process for video processing according to some embodiments of the present disclosure.

In some embodiments, a video processing system 100 may be applied to a digital image/video compression system, such as air television broadcasting, cable television transmission, satellite television transmission, such as an aerial TV broadcasting system, a cable TV transmission system, a satellite TV transmission system, an Internet video transmission system, a digital video stored in media, or the like. As used herein, an image/video compression refers to a process of reducing the amount of data required to present the digital images/videos. The purpose of the image/video compression may be to reduce redundant information in image/video data so as to store and transmit data effectively.

As shown in FIG. 1, the video processing system 100 may include a source signal 110, a source encoder 120, a channel 130, a source decoder 140, and a decoded signal 150.

In some embodiments, the source signal 110 may include source image data. In some embodiments, the source image data may refer to uncompressed original image data that has not been processed by a digital image editing and compression application. The source image data may include one or more source images, a source video, etc. A source image may include a video tape, a laser disk, a dynamic script, a digital image file, or the like. The source video may refer to uncompressed dynamic images, and a storage format of the source video may include a digital video format.

In some embodiments, the source encoder 120 may refer to a signal compression standard completed by software and/or hardware applications. The source encoder 120 may be configured to compress a source signal (e.g., a source image, a source video) at a sending end to obtain an encoded source signal. In some embodiments, the source encoder 120 may predict and encode the source signal. Specifically, the source encoder 120 may predict, based on one or more previous source signals that have been encoded before a source signal, the source signal to obtain a prediction value of the source signal. Further, the source encoder 120 may encode a difference between an actual value and the prediction value of the source signal. In some embodiments, the prediction may include a string prediction (SP). More descriptions regarding the SP may be found elsewhere in the present disclosure, for example, FIGS. 2A-2B and relevant descriptions thereof.

In some embodiments, the video processing system 100 may further include a channel encoder. The channel encoder may refer to a device or program that may further encode an encoded source signal before channel transmission at the sending end. The channel encoder may be configured to perform an error correction.

In some embodiments, the channel 130 may transmit or store encoded image/video data. The channel 130 may include a wireless channel, a wired channel, or a frequency band. The channel 130 may include a twisted pair, a cable, an optical fiber, or a medium that may propagate electromagnetic waves.

In some embodiments, the encoded image data may be stored in a storage device (e.g., a hard disk), and the encoded image data may be read from the storage device during a subsequent decoding processing process.

In some embodiments, the video processing system 100 may include a channel decoder. The channel decoder may be configured at a receiving end to detect and correct an error in data transmission. The encoded source signal may be unzipped by a source decoder 140.

In some embodiments, the source decoder 140 may refer to a signal compression standard completed by software or hardware applications. The source decoder 140 may be configured to generate an approximation of the source signal (e.g., a source image or a source video) in a decoding end for playback. For example, the source decoder 140 may be configured to obtain an approximation of the source signal by decoding the encoded source signal.

In some embodiments, the decoded signal 150 may refer to data reconstructed from the source signal 110 after being encoded and decoded. The decoded signal 150 may include image data after being compressed and decompressed.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2A:
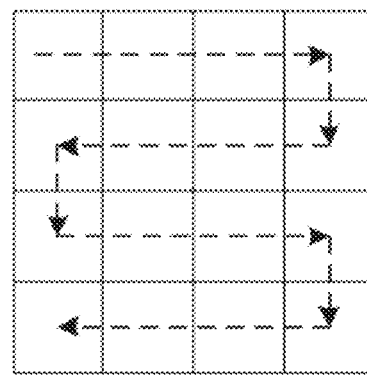
FIG. 2A is a schematic diagram illustrating an exemplary process for traversing a current block according to some embodiments of the present disclosure.

FIG. 2A is a schematic diagram illustrating an exemplary process for traversing a current block according to some embodiments of the present disclosure.

Figure 2B:
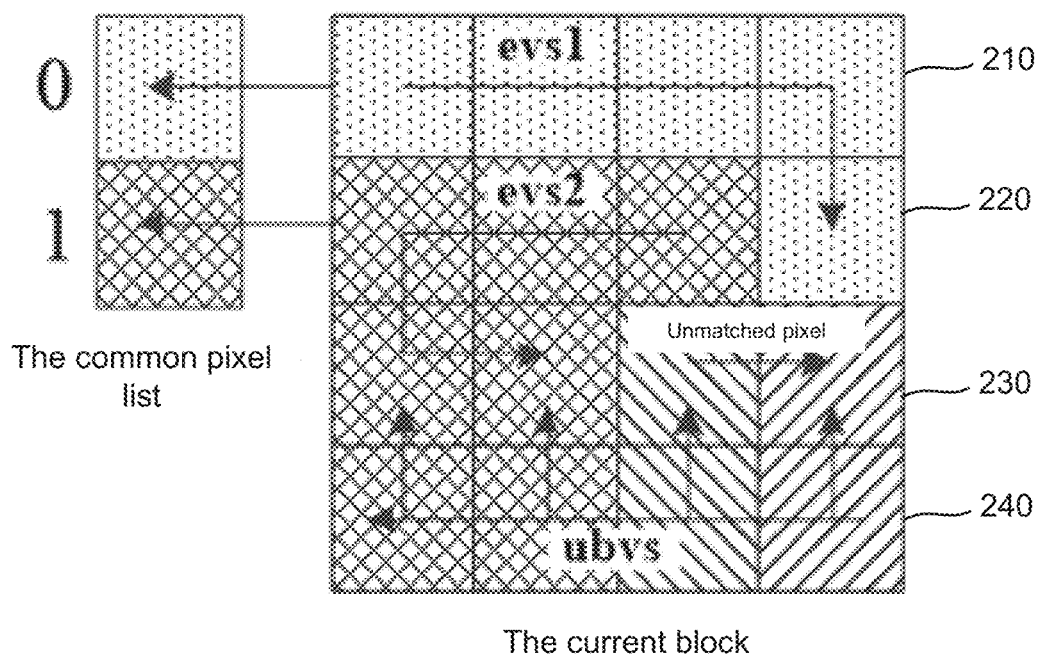
FIG. 2B is a schematic diagram illustrating exemplary string prediction according to some embodiments of the present disclosure.

FIG. 2B is a schematic diagram illustrating exemplary string prediction according to some embodiments of the present disclosure.

String prediction (SP) may refer to the prediction of several consecutive pixels in a current block (also referred to as an encoding unit or a current encoding unit). In some embodiments, a portion of the current block may be a string (also referred to as a pixel string or a current string). In some embodiments, an entire current block may be a string. The string (e.g., the entire current block) may be predicted based on a preset traversal order. As shown in FIG. 2A, the current block may be traversed for prediction in a bow shape from top to bottom with a pixel located at an upper left corner of the current block as a starting point. It should be noted that the preset traversal order may be set to other orders than the order shown in FIG. 2A, or set according to actual application scenarios, which may not be limited herein.

The SP may include an equal value string unit basis vector string (evs_ubvs) prediction pattern. The evs_ubvs prediction pattern may predict a string by using frequently-occurring pixels or unit basis vectors. After a current block is predicted using the evs_ubvs prediction pattern, a string and/or a pixel in the obtained prediction block corresponding to the current block may include an equal value string (evs), a unit basis vector string (ubvs), and/or an unmatched pixel. The evs may refer to a string in which all pixels have a same value and are predicted based on a same frequently-occurring pixel. The ubvs may refer to a string that may be predicted based on a string located above the string. The unmatched pixel may refer to a pixel in the current block that does not belong to an evs or ubvs.

In some embodiments, previous frequently-occurring pixels obtained from a previous frequently-occurring pixel list (denoted as PreSrb) may be filled into an initial frequently-occurring pixel list (denoted as an initial Srb) of a current block. Further, a clustering manner may be performed on the initial Srb of the current block to obtain new frequently-occurring pixels in the current block. The new frequently-occurring pixels may be filled into the initial Srb of the current block, and then a duplicate checking operation may be performed on the initial Srb of the current block. The initial Srb that has been performed the duplicate checking operation may be selected and sorted based on a sum of squared error (SSE) to obtain a frequently-occurring pixel list (denoted as Srb) of the current block.

In some embodiments, for each (also referred to as a current pixel) of pixels in the current block, a difference between the current pixel and each of frequently-occurring pixels in the Srb corresponding to the current block may be determined. A frequently-occurring pixel with a smallest difference may be selected from the frequently-occurring pixels in the Srb as an optimal frequently-occurring pixel of the current pixel.

In some embodiments, if the difference between the current pixel and the optimal frequently-occurring pixel of the current pixel is greater than a threshold (denoted as i_errorlimit), a rate-distortion cost (RDcost) of directly encoding the current pixel may be determined. If the rate-distortion cost is less than the difference between the current pixel and the optimal frequently-occurring pixel of the current pixel (which indicates that differences between the current pixel and all frequently-occurring pixels in the Srb of the current block are large), the direct encoding of the current pixel may save bit cost. In such cases, the current pixel may be an unmatched pixel, that is, a prediction value of the current pixel may be a pixel value of the current pixel. If the difference between the current pixel and the optimal frequently-occurring pixel of the current pixel is not greater than the threshold or the rate-distortion cost of directly encoding the current pixel is not less than the difference between the current pixel and the optimal frequently-occurring pixel of the current pixel, the prediction value of the current pixel may be a pixel value of the optimal frequently-occurring pixel.

In some embodiments, an unmatched pixel string may be determined by traversing pixels in the current block. In some embodiments, if a pixel located at a starting position of the current block is an unmatched pixel, the pixel may be added to a pixel string, and whether a next pixel of the pixel is an unmatched pixel or not may be determined. If the next pixel of the pixel is an unmatched pixel, the next pixel of the pixel may be added to the pixel string. Further, the above operation may be repeated until a matched pixel appears, as a result, the pixel string may be obtained. On the basis, a candidate prediction string of the pixel string may include an unmatched pixel string composed of unmatched pixels in the pixel string.

In some embodiments, a matched pixel string may be determined by traversing the pixels in the current block. In some embodiments, if a pixel located at a starting position of the current block is a matched pixel that matches with a pixel A, the pixel located at the starting position of the current block may be added to a pixel string, and a frequently-occurring pixel of the pixel located at the starting position of the current block may be recorded as the pixel A. Further, whether a frequently-occurring pixel of a next pixel of the pixel matches with the pixel A may be determined. If the frequently-occurring pixel of the next pixel matches with the pixel A, the next pixel may be added to the pixel string. The above operation may be repeated until a frequently-occurring pixel of a pixel does not match with the pixel A, as a result, the pixel string may be obtained. In addition, a length of the pixel string (denoted as srb_length) may be recorded. On the basis, a candidate prediction string of the pixel string may include an evs composed of frequently-occurring pixels of the pixel string.

Motion vectors of adjacent pixels may have a high correlation, so that each of the motion vectors may be predicted based on a prediction vector. For example, a coordinate system may be constructed in the current block with a current pixel as an origin. According to the coordinate system, a vector expression of a prediction vector may be (0, −n), wherein n is a positive integer. The value of n may be set according to actual application scenarios, which may not be limited herein. In some embodiments, for the pixel string determined above, a candidate prediction string of the pixel string may be predicted based on a prediction vector of the pixel string. In some embodiments, the prediction vector may be selected from a plurality of preset vectors. Different preset vectors of the plurality of preset vectors may respectively point to pixels that are located in a preset direction of the pixel string and have different pixel row spacings from the pixel string. In some embodiments, the plurality of preset vectors may include, but not limited to (0, −1), (0, −2), (0, −3), . . . , (0, −n). In some embodiments, a certain count of prediction vectors may be selected from the plurality of preset vectors based on a size of the current block. The certain count of prediction vectors may be positively correlated with the size of the current block. That is, the larger the size of the current block is, the greater the certain count of prediction vectors may be.

In some embodiments, the plurality of preset vectors may be sorted based on the pixel row spacing from small to large. The count (or number) of the plurality of preset vectors may be obtained by mapping the size of the current block based on a preset mapping relationship, and then a preset count of preset vectors with the highest ranking may be selected from the plurality of sorted preset vectors as the prediction vectors, which may reduce a probability that the selected prediction vectors point to outside of the current block, thereby improving the accuracy of the selected prediction vectors.

As shown in FIG. 2B, strings evs1 and evs2 in a current block may be predicted using two frequently-occurring pixels index0 and index1 in a frequently-occurring pixel list, respectively. Two twill blocks in a third pixel row 230 of the current block may be two unmatched pixels which may form an unmatched pixel string with a length of 2. A last pixel row 240 of the current block may be a ubvs.

The frequently-occurring pixel list of the current block may include two kinds of pixels. As shown in FIG. 2B, the two kinds of pixels may be represented by rectangles filled with different shadows, respectively. In a process of traversing the current block in a bow shape (as shown in FIG. 2A) from top to bottom, a pixel string (i.e., a pixel string composed of four pixels in a first pixel row 210 of the current block and a last pixel in a second pixel row 220 of the current block) including pixels that are represented by rectangles filled with points may be obtained. A candidate string (also referred to as a candidate prediction string) of the pixel string may include a candidate string whose prediction string type is evs. A candidate string of evs may be evs1 composed of frequently-occurring pixels 0. Since the pixel string is located at the first pixel row 210 of the current block, there may be no candidate string whose prediction string type is evs, so that the evs1 may be taken as the current string. In addition, a pixel string (i.e., a pixel string composed of three pixels in the second pixel row 220 of the current block and two pixels in the third pixel row 230 of the current block) including pixels that are represented by rectangles filled with grid may be obtained. A candidate string of the pixel string may include a candidate string whose prediction string type is evs. A candidate string of evs may be evs2 composed of frequently-occurring pixels 1. Since same frequently-occurring pixels do not exist above the pixel string, there may be no candidate string whose prediction string type is evs, so that evs2 may be taken as the current string. In addition, a pixel string (i.e., a pixel string composed of the last two pixels in the third pixel row 230 of the current block) including pixels that are represented by rectangles filled with slashes may be obtained. A candidate string of the pixel string may include a candidate string whose prediction string type is unmatched pixels. Since the last two pixels in the third pixel row 230 of the current block belongs to unmatched pixels, and there are no same pixels above the two pixels, the pixel string composed of the two pixels may be taken as the current string. That is, during encoding, the pixel string composed of the last two pixels in the third pixel row 230 of the current block may be directly encoded. Since pixels in a fourth pixel row 240 of the current block are the same as pixels in the third pixel row 230 of the current block, when the pixels in the fourth row form a pixel string, a candidate string (also referred to as a ubvs candidate string) whose prediction string type is ubvs may be predicted based on a prediction vector (0, −1), and a prediction cost may be the lowest in all candidate strings, so that the ubvs candidate string may be taken as the current string.

According to the above embodiments, a pixel string in the current block may be determined and several candidate strings of the pixel string may be obtained. The several candidate strings may include a candidate string whose prediction string type is ubvs. The ubvs candidate string may be predicted based on the prediction vector that is selected from the plurality of preset vectors. A preset vector may point to the pixels that are located in the preset direction of the pixel string. The pixels pointed to by different preset vectors may have different pixel string spacings from the pixel string. Further, a prediction string of the pixel string may be obtained based on prediction costs of the several candidate strings. In the process of SP, the prediction vector may be selected from the plurality of preset vectors, which may improve a selection range of the prediction vector compared with setting a single prediction vector. As a result, the flexibility and accuracy of SP may be improved, bit cost may be reduced, and the compression performance is improved, that is, the prediction costs of the SP is reduced as much as possible, which may be beneficial for improving the quality of video encoding that is performed using the current string.

Figure 3:
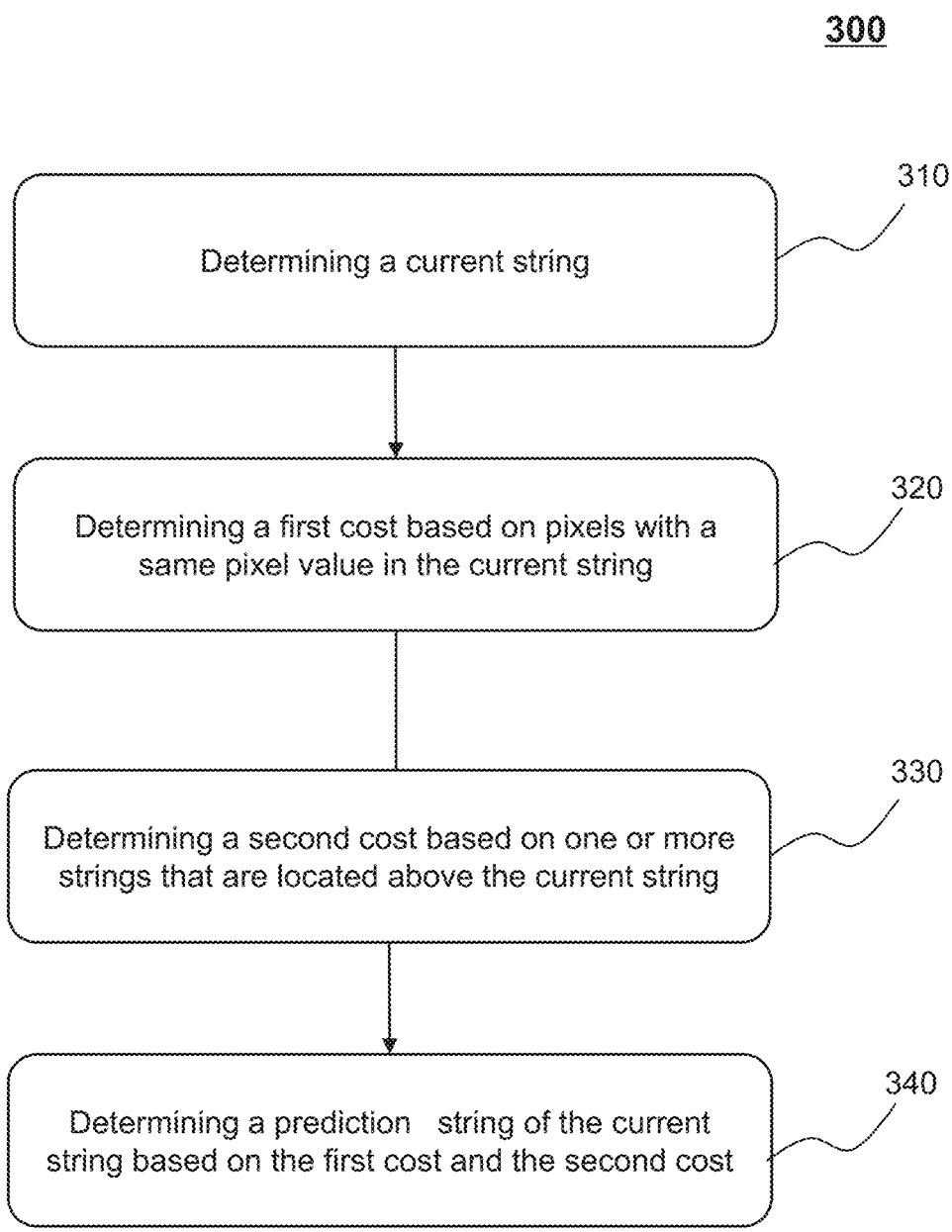
FIG. 3 is a flowchart illustrating an exemplary process for video processing according to some embodiments of the present disclosure.

FIG. 3 is a flowchart illustrating an exemplary process for video processing according to some embodiments of the present disclosure. In some embodiments, the process 300 may be implemented by a video processing system (e.g., a video processing system 500 illustrated in FIG. 5). In some embodiments, the video processing system may be implemented by software and/or hardware, and/or may be integrated into a video processing device that includes a processing device. In some embodiments, at least part of process 300 may be performed by the processing device including at least one processor and a storage device. For example, the process 300 may be stored in the storage device in the form of instructions (e.g., an application), and invoked and/or executed by the processing device. The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

In 310, a current string may be determined. In some embodiments, operation 310 may be implemented by a determination module 510.

In some embodiments, the current string may refer to several consecutive pixels in a current block.

In some embodiments, the current string may be determined by dividing the current block in any manner. For example, the current string may be determined by dividing the current block based on textures and/or other attributes of pixels in the current block. In some embodiments, a dividing manner of the current block may include horizontal dividing.

In some embodiments, the current string may be determined by limiting a length of the current string being an integer multiple of a reference value (denoted as M). The reference value M may be a natural number larger than 1. In some embodiments, in order to facilitate hardware implementation, a video encoding system may limit pixel strings with different lengths to the integer multiple of the reference value for encoding. In some embodiments, the current string may be determined by increasing a length of the current string to the integer multiple of the reference value. In some embodiments, the current string may be determined based on a style of the current string. As described in connection with FIGS. 2A-2B, the type of the current string may include one of unmatched pixels, an equal value string (evs), and a unit basis vector string (ubvs). Specifically, if the type of the current string is the unmatched pixels, the current string may be determined by increasing unmatched pixels in the current string. If the type of the current string is evs or ubvs, the current string may be determined by reducing a length of the evs or the ubvs to the integer multiple of the reference value. Exemplary processes A, B, and C for determining the current string may be described as follows.

Process A

If the length of the current string is not the integer multiple of the reference value M, the current string may be determined by increasing the length of the current string to the integer multiple of the reference value M. For example, if M is 4 and the length of the current string is 7, the length of the current string may be increased to 8. The type of the increased pixels in the current string may be modified to be the same as the type of the current string. The increasing the length of the current string may include traversing, in a bow shape (as shown in FIG. 2A) with a pixel located at an upper left corner of a current block corresponding to the current string as a starting point, pixels in the current block, which may be implemented by the following operations 311-333.

In operation 311, whether the type of the current string is a matched string or an unmatched string may be determined.

In some embodiments, if a pixel located at a starting position of the current string is an unmatched pixel, the type of the current string may be determined as the unmatched string. Further, whether a next pixel of the pixel is an unmatched pixel may be determined until a matched pixel is determined. In this case, whether the length of the current string is the integer multiple of the reference value M may be determined. If the length of the current string is the integer multiple of the reference value M, the length (denoted as srb_length) of the unmatched string may be recorded, and operation 312 may be proceeded. If the length of the current string is not the integer multiple of the reference value M, the determined matched pixel may be set as an unmatched pixel, and if pixel located at the starting position of the current string is an unmatched pixel, the type of the current string may be determined as the unmatched string may be repeated.

In some embodiments, if the pixel located at the starting position of the current string is a matched pixel, the type of the current string may be determined as an evs. A frequently-occurring pixel (denoted as pixel A) of the pixel located at the starting position of the current string may be recorded. Further, whether a frequently-occurring pixel of a next pixel of the pixel located at the starting position of the current string is equal to the pixel A may be determined until a certain pixel whose frequently-occurring pixel is not equal to the pixel A is determined. In this case, whether the length of the current string is the integer multiple of the reference value M may be determined. If the length of the current string is the integer multiple of the reference value M, a count of the pixels whose frequently-occurring pixels are equal to the pixel A may be recorded as the length (denoted as srb_length) of the evs, and operation 312 may be proceeded. If the length of the current string is not the integer multiple of the reference value M, the frequently-occurring pixel of the certain pixel may be set as pixel A, and the if the pixel located at the starting position of the current string is a matched pixel, the type of the current string may be determined as the evs may be repeated. It should be noted that, in the present disclosure, a pixel is equal to another pixel means that a pixel value of the pixel is equal to a pixel value of the another pixel.

In operation 312, in response to determining that the current string is not a matched string and an unmatched string, whether the type of the current string is ubvs may be determined. If a position of a pixel to be processed is greater than or equal to a width of the current block corresponding to the current string and the type of a previous pixel string of the current string is not ubvs, whether the type of the current string is ubvs may be determined.

In some embodiments, if a frequently-occurring pixel of the pixel to be processed is equal to a frequently-occurring pixel of a pixel located above the pixel to be processed, a further determination may be performed, that is whether a frequently-occurring pixel of a next pixel of the pixel to be processed is the same as a frequently-occurring pixel of a pixel located above the next pixel may be determined until that a frequently-occurring pixel of a certain pixel is different from a frequently-occurring pixel of a pixel located above the certain pixel. In this case, whether the length of the current string is the integer multiple of the reference value M may be determined. If the length of the current string is the integer multiple of the reference value M, a count of the pixels whose frequently-occurring pixels are the same as the frequently-occurring pixel of pixels located above the pixels may be recorded as a length of ubvs. Further, a total distortion may be determined, and operation 313 may be proceeded. If the length of the current string is not the integer multiple of the reference value M, the frequently-occurring pixel of the certain pixel may be set to be equal to the frequently-occurring pixel of the pixel located above the certain pixel, and if the frequently-occurring pixel of the pixel to be processed is equal to the frequently-occurring pixel of a pixel located above the pixel to be processed, the further determination may be performed may be repeated.

In some embodiments, if the frequently-occurring pixel of the pixel to be processed is not equal to the frequently-occurring pixel of the pixel located above the pixel to be processed, the current string may not be a ubvs. The length of the ubvs may be 0. If the length of the ubvs is greater than 0, a count of bits corresponding to the encoding of the ubvs may be calculated.

In operation 313, the type of current string may be finally determined.

If the length of the ubvs is greater than 0, whether an average cost of pixels in the ubvs is less than or equal to an average cost of pixels in the evs or the unmatched string may be determined. If the average cost of pixels in the ubvs is less than or equal to the average cost of pixels in the evs or the unmatched string, the type of the current string may be determined as ubvs. If the average cost of pixels in the ubvs is greater than the average cost of pixels in the evs or the unmatched string, the type of the current string may be determined as the evs or the unmatched string.

Syntax modifications involved in the above exemplary process A for encoding evs_ubvs may be as shown in Table (1).

Process B

If the length of the current string is not the integer multiple of the reference value M, the current string may be determined based on the type of the current string, that is, different types of the current string may be processed by different ways, which may be implemented by the following operations 321-323.

In operation 321, if a pixel located at the starting position of the current string is an unmatched pixel, the current string is an unmatched string. Further, whether the next pixel of the pixel located at the starting position of the current string is an unmatched pixel may be determined until a matched pixel is determined, and then whether the length of the current string is the integer multiple of the reference value M may be determined. If the length of the current string is the integer multiple of the reference value M, the length (denoted as srb_length) of the unmatched string may be recorded.

In operation 322, if the pixel located at the starting position of the current string is a matched pixel, the current string is an evs.

In some embodiments, whether the frequently-occurring pixel of the next pixel of the pixel located at the starting position of the current string is equal to the pixel A may be determined until the certain pixel whose frequently-occurring pixel is not equal to the pixel A is determined. Further, whether the length of the current string is the integer multiple of the reference value M may be determined. If the length of the current string is the integer multiple of the reference value M, the count of the pixels whose frequently-occurring pixels are equal to the pixel A may be recorded as the length (denoted as srb_length) of evs.

In some embodiments, if the length of the current string is not the integer multiple of the reference value M, the length (denoted as srb_length−srb_length % 4) of the current string may be decreased to the integer multiple of the reference value M (e.g., 4). Further, the pixels in the current block may be traversed in an anti-bow shape from a current position (i.e., a position of a last pixel in the current string

TABLE 1

| Modified syntax | description |
| --- | --- |
| pixel_duplication_count_shift2_minus1 | This syntax indicates that a length of an evs is shifted by 2 bits to the right and then subtracted by 1. An actual encoding value in the present disclosure is (pixel_duplication_count_minus1 >> 2) − 1. |
| str_length_shift2_minus1[i] | This syntax indicates that a length of a ubvs is shifted by 2 bits to the right and then subtracted by 1. An actual encoding value in the present disclosure is (str_length_minus1[i] >> 2) − 1. |
| isc_unmatched_pixel_num_shift2_minus1 | This syntax indicates that a length of an unmatched string is shifted by 2 bits to the right and then subtracted by 1. An actual encoding value in the present disclosure is (isc_unmatched_pixel_num_minus1 >> 2) − 1. |
| unmatched_pixel_max_length_shift2_minus1 | This syntax indicates that a maximum value of a count of pixels in an unmatched string is shifted by 2 bits to the right and then subtracted by 1. An actual encoding value in the present disclosure is (unmatched_pixel_max_length_minus1 >> 2) − 1. | after the length of the current string has been decreased), and the pixels (i.e., srb_length % 4) decreased from the current string that has a count less than a multiple of 4 may be set as unmatched pixels. The frequently-occurring pixels of the unmatched pixels may be set as themself. A subsequent pixel, in the traversal direction of the current block, of the pixels decreased from the current string may be processed until that a count of the subsequent pixel and the pixels decreased from the current string is the multiple of 4. When the count of the subsequent pixel and the pixels decreased from the current string is the multiple of 4, whether the subsequent pixel is an unmatched pixel may be determined. If the subsequent pixel is an unmatched pixel, whether subsequent pixels are an unmatched string may be determined.

In operation 323, when the current string is an ubvs, that is, the starting position of the current string is has been determined as an ubvs.

In some embodiments, as described in connection with the operation 311 in exemplary process A, if a frequently-occurring pixel of a certain pixel at a certain position in the current string is different from a frequently-occurring pixel of a pixel located above the certain position, whether the length of the current string is the integer multiple of the reference value M may be determined. If the length of the current string is the integer multiple of the reference value M, a count of the pixels whose frequently-occurring pixels are the same as the frequently-occurring pixel of pixels located above the pixels may be recorded as a length (denoted as srb_above_length) of ubvs. Further, a total distortion may be determined, and the determining of the current string may be ended.

In some embodiments, if the length of the current string is not the integer multiple of the reference value M, the length (denoted as srb_above_length−srb_above_length % 4) of the current string may be decreased to the integer multiple of the reference value M (e.g., 4). Further, the pixels in the current block may be traversed in an anti-bow shape from a current position (i.e., a position of a last pixel in the current string after the length of the current string has been decreased), and the pixels (i.e., srb_length % 4) decreased from the current string that has a count less than a multiple of 4 may be set as unmatched pixels. The frequently-occurring pixels of the unmatched pixels may be set as itself. A subsequent pixel, in the traversal direction of the current block, of the pixels decreased from the current string may be processed until that a count of the subsequent pixel and the pixels decreased from the current string is the multiple of 4. When the count of the subsequent pixel and the pixels decreased from the current string is the multiple of 4, whether the subsequent pixel is an unmatched pixel may be determined. If the subsequent pixel is an unmatched pixel, whether subsequent pixels are an unmatched string may be determined.

Syntax modification involved in the above exemplary process B may be the same as the syntax modification involved in the exemplary process A as shown in the above Table (1), which may not be repeated herein.

Process C

If the length of the current string is not the integer multiple of the reference value M, the current string may be determined by decreasing the length of the current string to the integer multiple of the reference value M. The pixels decreased from the current string and subsequent pixels of the pixels decreased from the current string may form a pixel string with a fixed length of a multiple of M. Pixels or a portion of the pixels in the pixel string may be encoded based on original types of the pixels or the portion of the pixels in the pixel string.

In the process of evs_ubvs prediction, if the length of the current string is not the integer multiple of the reference value M, the length of the current string may be decreased to the integer multiple of the reference value M. The pixels decreased from the current string that has a count less than a multiple of M may be supplemented by the subsequent pixels of the pixels decreased from the current string to form a mixed string including M pixels. A length of the mixed string is M. The mixed string may belong to a kind of unmatched string. Except for pixels with a ubvs type, others pixels in the mixed string may be saved and encoded based on the original types of the others pixels. The pixels with a ubvs type may be encoded as unmatched pixels. Different types of the current string may be processed in different ways, which may be implemented by the following operations 331-333.

In operation 331, when the current string is an unmatched pixel string.

In some embodiments, as described in connection with operation 311 in exemplary process A, the pixel located at the starting position of the current string is an unmatched pixel. Further, whether the next pixel of the pixel located at the starting position of the current string is an unmatched pixel may be determined until a matched pixel is determined, and then whether the length of the current string is the integer multiple of the reference value M may be determined. If the length of the current string is the integer multiple of the reference value M, the length (denoted as srb_length) of the unmatched string may be recorded.

In some embodiments, if the length of the current string is not the integer multiple of the reference value M, the length (denoted as srb_length−srb_length % 4) of the current string may be decreased to the integer multiple of the reference value M (e.g., 4). Further, the pixels in the current block may be traversed in an anti-bow shape from a current position (i.e., a position of a last pixel in the current string after the length of the current string has been decreased), and the pixels (i.e., srb_length % 4) decreased from the current string that has a count less than a multiple of 4 may be set as mixed type pixels. A subsequent pixel, in the traversal direction of the current block, of the pixels decreased from the current string may be processed until that a length of the subsequent pixel and the pixels decreased from the current string is M. In such cases, a type of each of the subsequent pixel and the pixels decreased from the current string may be recorded.

In operation 332, when the current string is an evs, that is, as described in connection with the operation 311 in exemplary process A, the pixel located at the starting position of the current string is a matched pixel.

In some embodiments, whether the frequently-occurring pixel of the next pixel of the pixel located at the starting position of the current string is equal to the pixel A may be determined until the certain pixel whose frequently-occurring pixel is not equal to the pixel A is determined. Further, whether the length of the current string is the integer multiple of the reference value M may be determined. If the length of the current string is the integer multiple of the reference value M, the count of the pixels whose frequently-occurring pixels are equal to the pixel A may be recorded as the length (denoted as srb_length) of evs.

In some embodiments, if the length of the current string is not the integer multiple of the reference value M, the length (denoted as srb_length−srb_length % 4) of the current string may be decreased to the integer multiple of the reference value M (e.g., 4). Further, the pixels in the current block may be traversed in an anti-bow shape from a current position (i.e., a position of a last pixel in the current string after the length of the current string has been decreased), and the pixels (i.e., srb_length % 4) decreased from the current string that has a count less than a multiple of 4 may be set as mixed type pixels. A subsequent pixel, in the traversal direction of the current block, of the pixels decreased from the current string may be processed until that a length of the subsequent pixel and the pixels decreased from the current string is M. In such cases, a type of each of the subsequent pixel and the pixels decreased from the current string may be recorded.

In operation 333, when the current string is an ubvs, that is, the starting position of the current string is has been determined as an ubvs.

In some embodiments, as described in connection with the operation 312 in exemplary process A, if a frequently-occurring pixel of a certain pixel at a certain position in the current string is different from a frequently-occurring pixel of a pixel located above the certain position, whether the length of the current string is the integer multiple of the reference value M may be determined. If the length of the current string is the integer multiple of the reference value M, a count of the pixels whose frequently-occurring pixels are the same as the frequently-occurring pixel of pixels located above the pixels may be recorded as a length (denoted as srb_above_length) of ubvs. Further, a total distortion may be determined, and the determining of the current string may be ended.

In some embodiments, if the length of the current string is not the integer multiple of the reference value M, the length (denoted as (srb_above_length−srb_above_length % 4)) of the current string may be decreased to the integer multiple of the reference value M (e.g., 4). Further, the pixels in the current block may be traversed in an anti-bow shape from a current position (i.e., a position of a last pixel in the current string after the length of the current string has been decreased), and the pixels (i.e., srb_above_length % 4) decreased from the current string that has a count less than a multiple of 4 may be set as mixed type pixels. A subsequent pixel, in the traversal direction of the current block, of the pixels decreased from the current string may be processed until that a length of the subsequent pixel and the pixels decreased from the current string is M. In such cases, a type of each of the subsequent pixel and the pixels decreased from the current string may be recorded. It should be noted that the pixels with a ubvs type may be encoded as unmatched pixels.

It should be noted that syntax modification involved in the above exemplary process C for encoding the unmatched string, the evs, and the ubvs may be the same as the syntax modification involved in the exemplary process A as shown in the above Table (1), which may not be repeated herein.

Further, in the exemplary process C, if the current string is an unmatched string, a relevant syntax may need to be set to indicate relevant information of the mixed string.

In some embodiments, the mixed string may be an unmatched string. In order to distinguish the mixed string from ordinary unmatched strings, a syntax "isc_mixeded_pixel_str_present_flag" may need to be transmitted to indicate that the type of the unmatched string is a mixed string.

In some embodiments, if "isc_mixeded_pixel_str_present_flag" is 1, a length of the mixed string may not need to be transmitted, and the length of the mixed string may be fixed to 4 pixels. Each of the 4 pixels may have a match flag, for example, "match_flag [i]", wherein i may be equal to 0, 1, 2, or 3. If i=1, the pixel corresponding to the "match_flag [1]" may be an evs pixel, and "pv_address" may need to be transmitted. If i is equal to 0, the pixel corresponding to the "match_flag" [0] may be an unmatched string, and Y, U, and V components of the pixel may need to be transmitted.

In some embodiments, if "isc_mixeded_pixel_str_present_flag" is 0, the length of the mixed string and the Y, U, and V components of each pixel in the mixed string may be encoded in a way of encoding an unmatched string.

In some embodiments, the mixed string in the above exemplary process C may be processed as an independent string type, and each mixed string may need to be added the syntax "isc_mixeded_pixel_str_present_flag" to distinguish the mixed string from other strings.

In the present disclosure, the current string may be determined by setting the length of the current string being the integer multiple of the reference value, which may reduce the complexity of hardware implementation of the video encoding. Further, the lengths of different pixel strings in the present disclosure may be multiples of M, as a result, in actual encoding, the length of each pixel string may be encoded by encoding a value of the length divided by M, which may effectively reduce the count of bits of the encoding.

In 320, a first cost may be determined based on pixels with a same pixel value in the current string. In some embodiments, operation 320 may be implemented based on a first cost determination module 520.

In some embodiments, the pixels with the same pixel value in the current string may include all or a portion of pixels in the current string. For example, if pixel values of several consecutive pixels (e.g., 8) in the current string are the same, the several consecutive pixels may be considered as the pixels with the same pixel value in the current string.

In some embodiments, the first cost may refer to a cost corresponding to the smallest of differences between frequently-occurring pixels and the pixels with the same pixel value in the current string. Specifically, for each of the pixels with the same pixel value in the current string, differences each of which is between the pixel and each of frequently-occurring pixels in a frequently-occurring pixel candidate list may be determined. The smallest difference among the differences corresponding to the pixels with the same pixel value in the current string may be determined as the first cost.

In 330, a second cost may be determined based on one or more strings that are located above the current string. In some embodiments, operation 330 may be implemented based on a second cost determination module 530.

In some embodiments, the one or more strings that are located above the current string may include a string located directly above the current string and adjacent to the current string and a string located directly above the current string and separated from the current string by one or more pixel rows. For example, the one or more strings may include a string located directly above the current string and separated from the current string by 1 pixel row. As another example, the one or more strings may include a string located directly above the current string and separated from the current string by 2 pixel rows.

In some embodiments, a count of the one or more strings may be larger than 1. For example, the count of the one or more strings may be a logarithm of a height of a current block corresponding to the current string with a base of 2.

In some embodiments, a size of the current block may include the height of the current block. A preset mapping relationship, for example, a multiple linear relationship, between the height of the current block and a preset count of a plurality of preset vectors may be determined. For example, the plurality of preset vectors may be sorted in ascending order of pixel row spacing, for example, (0, −1), (0, −2), and (0, −3). Different height ranges where the height of the current block may correspond to different counts of present vectors of the current block. Different height ranges may be set, for example, a height range being smaller than T1, a height range from T1 to T2, and a height range exceeding T2. The height range being smaller than T1 may correspond to a preset count 1, that is if the height of the current block is in the height range being smaller than T1, the preset count of the plurality of preset vectors may be determined as 1. Accordingly, the preset vector (0, −1) may be determined as a prediction vector of the current block. The height range from T1 to T2 may correspond to a preset count 2, that is if the height of the current block is in the height range from T1 to T2, the preset count of the plurality of preset vectors may be determined as 2. Accordingly, the preset vectors (0, −1) and (0, −2) may be determined as prediction vectors of the current block. The height range exceeding T2 may correspond to a preset count 3, that is if the height of the current block is in the height range exceeding T2, the preset count of the plurality of preset vectors may be determined as 3. Accordingly, the preset vectors (0, −1), (0, −2), and (0, −3) may be determined as prediction vectors of the current block.

In some embodiments, the preset mapping relationship between the height of the current block and the preset count of the plurality of preset vectors may include a logarithmic relationship (i.e., a nonlinear relationship). For example, the preset mapping relationship may be expressed as $k=\log_2 height$, wherein k represents the preset count of the plurality of preset vectors, and height represents the height of the current block. When the preset mapping relationship is expressed as other nonlinear relationships, the preset count k may be greater than an actual count of the plurality of preset vectors. In this case, the preset count k may be set equal to the count of the plurality of preset vectors, that is, all preset vectors may be selected as the prediction vectors of the current block.

In some embodiments, the second cost may be determined based on the one or more strings that are located above the current string. For example, the second cost may be determined based on single one pixel string that is located above the current string. In some embodiments, the current string and the one or more strings may be compared. According to the comparison, a target string may be determined from the one or more strings. Further, a cost of the target string may be designated as the second cost. Specifically, the second cost may refer to a minimum prediction cost. A ubvs prediction may be performed on a certain count of strings that are located above the current string based on the prediction vectors of the certain count (denoted as X) of strings. The prediction costs corresponding to the certain count of strings that are located above the current string may be compared, and an i-th string may be selected from the certain count of strings as a target string from the certain count of strings, wherein $1 \leq i \leq X$ and a prediction cost of the i-th string may be a string with a smallest prediction cost among the certain count (denoted as X) of strings. The prediction cost of a string may be determined based on rate-distortion costs of pixels in the string. Specifically, an average value of the rate-distortion costs of the pixels in the string may be determined as the prediction cost of the string.

In 340, a prediction string of the current string may be determined based on the first cost and the second cost. In some embodiments, operation 340 may be implemented by a prediction module 540.

In some embodiments, the first cost and the second cost may be compared. According to the comparison, the prediction string of the current string may be determined. Specifically, a string corresponding to the smaller of the first cost and the second cost may be selected as the prediction string of the current string.

In some embodiments, strings that have been predicted in the current block may be adjusted. Specifically, two adjacent strings in the current block among the strings that have been predicted in the current block and satisfy a condition may be designated as a pair of target strings. The condition may include that prediction strings of the adjacent strings do not include an unmatched string. For example, the condition may include that the prediction strings of the adjacent strings include a ubvs and an evs. As another example, the condition may include that the prediction strings of the adjacent strings both are ubvs.

Further, one or more fusion prediction strings may be determined by fusing the pair of target strings based on prediction strings of the pair of target strings and a fusion degree. The fusion degree may include complete fusion and/or incomplete fusion. It should be noted that under the incomplete fusion, a pair of target pixel strings may be fused to obtain two fusion prediction strings. Under the complete fusion, a pair of target pixel strings may be fused to obtain one fusion prediction string. Specifically, in response to types of the prediction strings of the pair of target strings being the same, one fusion prediction string may be determined by fusing the pair of target strings based on the complete fusion. In response to types of the prediction strings of the pair of target strings being different, two fusion prediction strings may be determined by fusing the pair of target strings based on the incomplete fusion.

The above fusion operation may improve the flexibility and accuracy of SP, reduce bit cost, and improve compression performance. Further, one or more target prediction strings of the pair of target strings may be determined based on prediction costs of the prediction strings of the pair of target strings and prediction costs of the one or more fusion prediction strings, thereby optimizing a prediction result of SP and improving the quality of the video encoding.

In some embodiments, during the incomplete fusion of the pair of target strings, one of the two adjacent strings may be used as a reference pixel string and the other of the two adjacent strings may be used as a transfer pixel string. As used herein, the reference pixel string may refer to a pixel string used as a reference for fusion of the two adjacent strings. A portion of consecutive pixels in the transfer pixel string close to the reference pixel string may be transferred to the reference pixel string, so that a fusion pixel string (also referred to as a first fusion pixel string) corresponding to the reference pixel string and a fusion pixel string (also referred to as a second fusion pixel string) corresponding to the transfer pixel string may be obtained. A type of a fusion prediction string (also referred to as a first fusion prediction string) of the first fusion pixel string corresponding to the reference pixel string may be the same as a type of a prediction string of the reference pixel string. A type of a fusion prediction string (also referred to as a second fusion prediction string) of the second fusion pixel string corresponding to the transfer pixel string may be the same as a type of a prediction string of the transfer pixel string. For example, a target pixel string 1 and a target pixel string 2 may be a pair of target strings. A prediction string of the target pixel string 1 is evs. A prediction string of the target pixel string 2 is ubvs. The target pixel string 1 may be used as a transfer pixel string and the target pixel string 2 may be used as a reference pixel string. In such cases, a portion of consecutive pixels in the target pixel string 1 and close to the target pixel string 2 may be transferred to the target pixel string 2 to obtain a fusion pixel string A corresponding to the target pixel string 1 and a fusion pixel string B corresponding to the target pixel string 2. A length of the fusion pixel string A may be smaller compared with the target pixel string 1. A length of the fusion pixel string B may be greater compared with the target pixel string 2. A fusion prediction string of the fusion pixel string A may be still evs. A fusion prediction string of the fusion pixel string B may be still ubvs. Similarly, when the prediction strings of the target pixel string 1 and the target pixel string 2 are ubvs, the fusion prediction strings of the fusion pixel string A corresponding to the target pixel string 1 and the fusion pixel string B corresponding to the target pixel string 2 may be still ubvs.

In some embodiments, during the complete fusion of the pair of target strings, all pixels in the transfer pixel string may be transferred to the reference pixel string, and the pair of target pixel strings may be fused to obtain one fusion pixel string. The type of the fusion prediction string of the fusion pixel string may be the same as the type of the prediction string of the reference pixel string. For example, all pixels in the target pixel string 1 may be transferred to the target pixel string 2 to obtain a fusion pixel string C. A length of the fusion pixel string C may be equal to the length of the target pixel string 1 plus the length of the target pixel string 2. A fusion prediction string of the fusion pixel string C and the prediction string of the reference pixel string may be ubvs. Similarly, when the prediction strings of the target pixel string 1 and the target pixel string 2 are ubvs, the fusion prediction string of the fusion pixel string C may be ubvs.

In some embodiments, one or more target prediction strings of the pair of target strings may be determined based on prediction costs of the prediction strings of the pair of target strings and prediction costs of the one or more fusion prediction strings. For example, a prediction string (e.g., one of the prediction strings of the pair of target strings or one of the one or more fusion prediction strings) with a lowest rate-distortion cost may be determined as a target prediction string.

For example, the target pixel string 1 and the target pixel string 2 may be a pair of target strings. The prediction string of the target pixel string 1 is evs. The prediction string of the target pixel string 2 is ubvs. The target pixel string 1 and the target pixel string 2 may be incompletely fused to obtain the fusion prediction string A of the fusion pixel string A and the fusion prediction string B of the fusion pixel string B. Further, a first prediction cost of the prediction string of the target pixel string 1 and a second prediction cost of the prediction string of the target pixel string 2 may be obtained. A first sum of the first prediction cost and the second prediction cost may be obtained. In addition, a third prediction cost of the fusion prediction string A and a fourth prediction cost of the fusion prediction string B may be obtained. A second sum of the third prediction cost and the fourth prediction cost may be obtained. The first sum and the second sum may be compared. If the first sum is less than the second sum, the prediction strings of the target pixel string 1 and the target pixel string 2 may be designated as the target prediction strings. If the first sum is greater than or equal to the second sum, the fusion prediction string A and the fusion prediction string B may be designated as the target prediction strings.

As another example, the target pixel string 1 and the target pixel string 2 may be completely fused to obtain the fusion prediction string C of the fusion pixel string C. Further, a fifth prediction cost of the fusion prediction string C of fusion pixel string C may be obtained. The fifth prediction cost may be compared with the first sum. If the first sum is less than the fifth prediction cost, the prediction strings of the target pixel string 1 and the target pixel string 2 may be designated as the target prediction strings. If the sum is greater than or equal to the fifth prediction cost, the fusion prediction string C of the fusion pixel string C may be designated as the target prediction string. More descriptions regarding the fusion of the pair of target strings may be found elsewhere in the present disclosure, for example, FIGS. 4A-4D and relevant descriptions thereof.

Figure 4A:
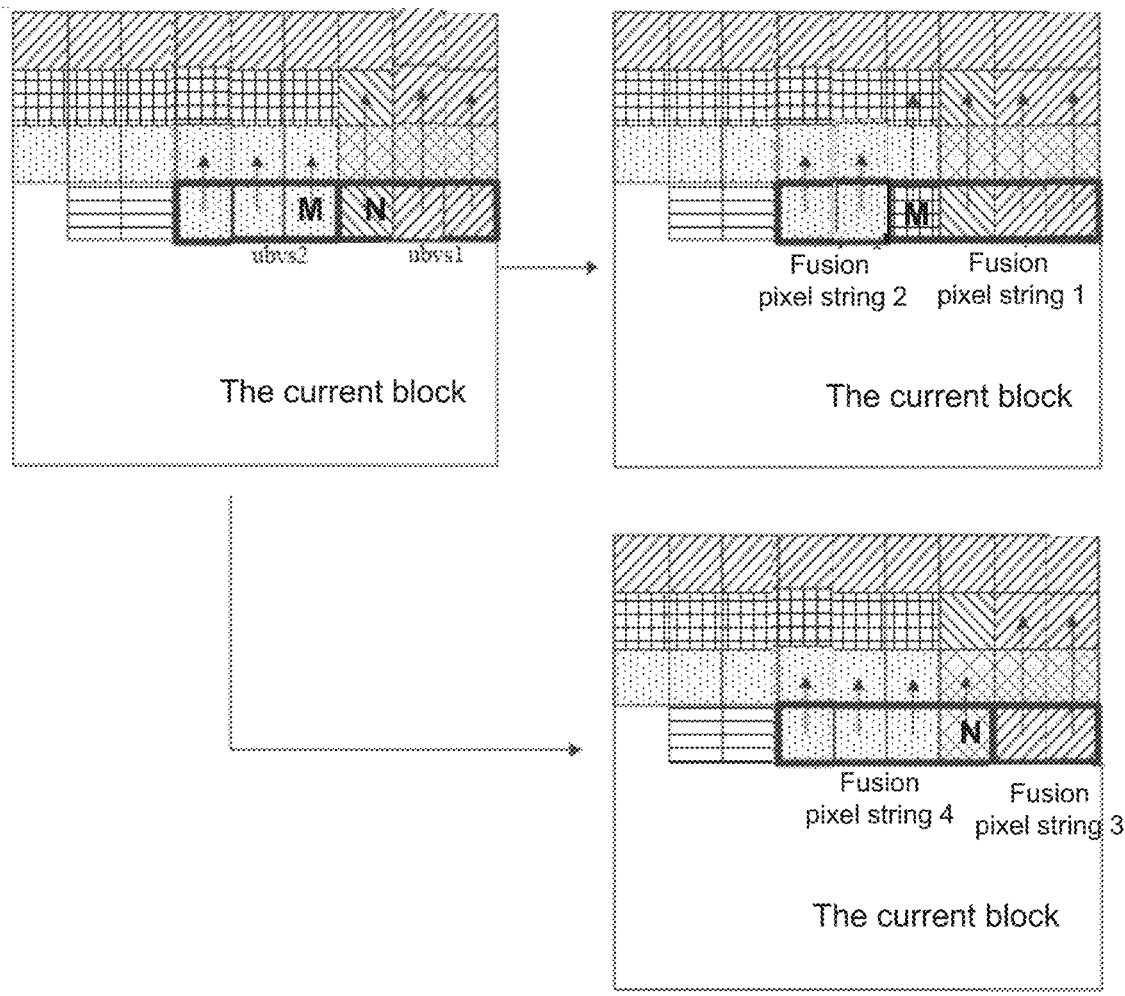
FIG. 4A is a flowchart illustrating an exemplary fusion process of a pair of target strings according to some embodiments of the present disclosure.

FIG. 4A is a flowchart illustrating an exemplary fusion process of a pair of target strings according to some embodiments of the present disclosure. In some embodiments, a pair of target strings may include a reference pixel string and a transfer pixel string. Starting from a pixel in the transfer pixel string closest to the reference pixel string, except for a pixel in the transfer pixel string furthest from the reference pixel string, other pixels in the transfer pixel string may be transferred to the reference pixel string one by one and predicted based on a prediction vector of a prediction string of the reference pixel string, which is equivalent to continuously increasing a length of the reference pixel string while continuously reducing a length of the transfer pixel string.

In some embodiments, the pair of target strings may include two ubvs. One of the two ubvs may be used as the reference pixel string and the other of the two ubvs may be used as the transfer pixel string.

As shown in FIG. 4A, ubvs1 and ubvs2 may be a pair of target strings. The ubvs1 may be used as a reference pixel string including 3 pixels, and the ubvs2 may be used as a transfer pixel string including 3 pixels. A pixel M in the ubvs2 closest to the ubvs1 may be transferred to the ubvs1, so that a length of the ubvs1 may be changed from 3 to 4, and a length of the ubvs2 may be changed from 3 to 2. As a result, a new ubvs1 (i.e., a fusion pixel string 1) and a new ubvs2 (i.e., a fusion pixel string 2) are obtained. A prediction vector of a prediction string of the ubvs1 (also referred to as previous ubvs1) or the new ubvs1 may be (0, −2), and a prediction vector of a prediction string of the ubvs2 (also referred to as previous ubvs2) or the new ubvs2 may be (0, −1). It should be noted that arrows in the current block in FIGS. 4A-D may indicate directions of prediction vectors. Therefore, the pixel M may be predicted by the prediction vector (0, −1) before being transferred, and be predicted by the prediction vector (0, −2) after being transferred. A fusion prediction string of the fusion pixel string 2 may be determined based on the prediction vector (0, −1), and a fusion prediction string of the fusion pixel string 1 may be determined based on the prediction vector (0, −2).

As another example, the previous ubvs2 may be used as the reference pixel string and the previous ubvs1 may be used as the transfer pixel string. A pixel N in the previous ubvs1 closest to the ubvs2 may be transferred to the ubvs2, so that the length of the previous ubvs2 may be changed from 3 to 4, and the length of previous ubvs1 may be changed from 3 to 2. As a result, a new ubvs1 (i.e., a fusion pixel string 3) and a new ubvs2 (i.e., a fusion pixel string 4) are obtained. The prediction vector of the prediction string of the previous ubvs1 or the new ubvs1 may be (0, −2), and the prediction vector of the prediction string of the previous ubvs2 or the new ubvs2 may be (0, −1). Therefore, the pixel N may be predicted by the prediction vector (0, −2) before being transferred, and be predicted by the prediction vector (0, −1) after being transferred. A fusion prediction string of the fusion pixel string 4 may be determined based on the prediction vector (0, −1), and a fusion prediction string of the fusion pixel string 3 may be determined based on the prediction vector (0, −2).

Figure 4B:
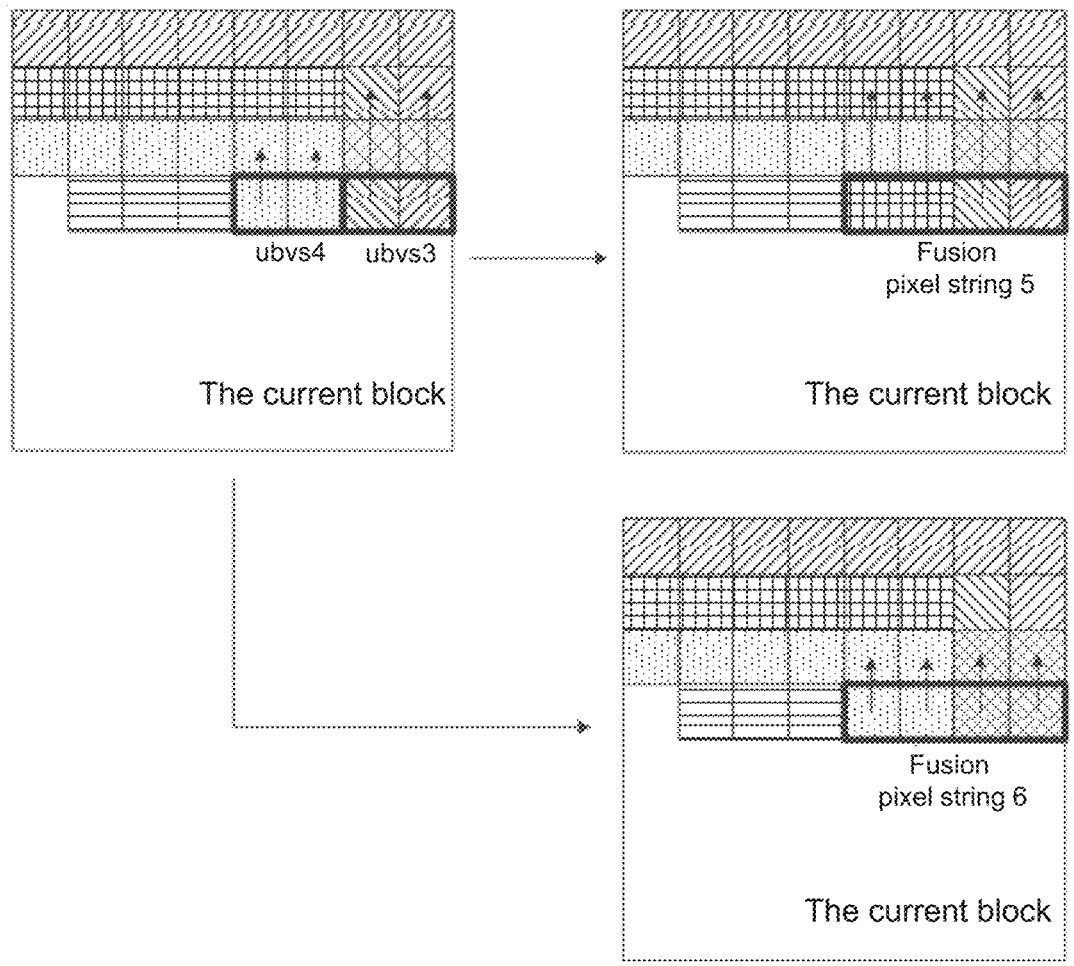
FIG. 4B is a flowchart illustrating an exemplary fusion process of a pair of target strings according to some embodiments of the present disclosure.

FIG. 4B is a flowchart illustrating an exemplary fusion process of a pair of target strings according to some embodiments of the present disclosure. In some embodiments, all pixels in the transfer pixel string may be transferred to the reference pixel string (i.e., complete fusion), so that the transfer pixel string and the reference pixel string may be combined to obtain a new pixel string (i.e., a fusion pixel string). The new pixel string may be predicted based on the prediction vector of the prediction string of the reference pixel string to obtain a fusion prediction string of the fusion pixel string.

As shown in FIG. 4B, ubvs3 and ubvs4 may be a pair of target strings. For example, the ubvs3 may be used as a reference pixel string and the ubvs4 may be used as a transfer pixel string, all pixels in the ubvs4 may be transferred to the ubvs3, so that the ubvs3 and the ubvs4 may be combined to obtain a new ubvs (i.e., a fusion pixel string 5) with a length of 4. A prediction vector of a prediction string of the ubvs3 may be used to predict the new ubvs (i.e., the fusion pixel string 5) to obtain a fusion prediction string of the fusion pixel string 5. Specifically, the prediction vector of the prediction string of the ubvs3 may be (0, −2), and a prediction vector of a prediction string of the ubvs4 may be (0, −1). The fusion prediction string of the fusion pixel string 5 may be determined based on pixels pointed by the prediction vector (0, −2).

As another example, the ubvs4 may be used as the reference pixel string and the ubvs3 may be used as the transfer pixel string, all pixels in the ubvs3 may be transferred to the ubvs4, so that the ubvs4 and the ubvs3 may be combined to obtain a new ubvs (i.e., a fusion pixel string 6) with a length of 4. The prediction vector of the prediction string of the ubvs4 may be used to predict the new ubvs to obtain the fusion prediction string of the fusion pixel string 6. Specifically, the prediction vector of the prediction string of the ubvs3 may be (0, −2), and the prediction vector of the prediction string of the ubvs4 may be (0, −1). The fusion prediction string of the fusion pixel string 6 may be determined based on pixels pointed by the prediction vector (0, −1).

In some embodiments, when the prediction vector of the prediction string of ubvs3 and the prediction vector of the prediction string of ubvs4 are the same, ubvs3 and ubvs4 may be directly combined to obtain a fusion pixel string with a length of a length sum of the ubvs3 and ubvs4. The fusion pixel string may be predicted by the prediction vector of the prediction string of the ubvs1 or the ubvs2. A fusion prediction string of the fusion pixel string may be determined based on pixels pointed by the prediction vector of the prediction string of the ubvs1 or the ubvs2.

Figure 4C:
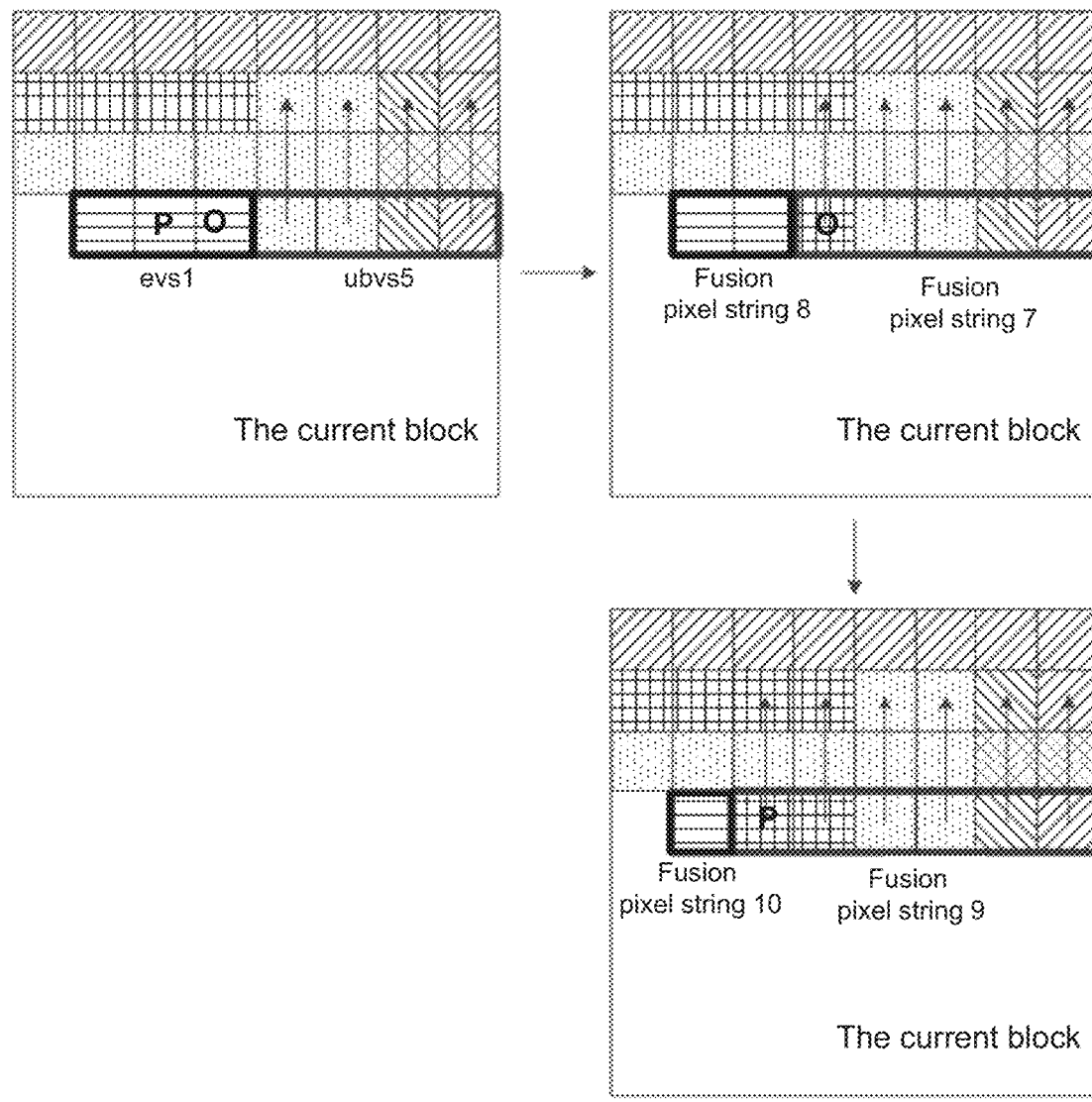
FIG. 4C is a flowchart illustrating an exemplary fusion process of a pair of target strings according to some embodiments of the present disclosure.

FIG. 4C is a flowchart illustrating an exemplary fusion process of a pair of target strings according to some embodiments of the present disclosure. In some embodiments, the pair of target strings may include ubvs and evs, that is, one of the pair of target pixel strings may be ubvs and the other of the pair of target pixel strings may be evs. A prediction string of the evs may include pixels with a same preset pixel value.

As shown in FIG. 4C, ubvs5 and evs1 may be a pair of target strings. The ubvs5 may be used as a reference pixel string including 4 pixels, and the evs1 may be used as a transfer pixel string including 3 pixels. A pixel O in the evs1 closest to the ubvs5 may be transferred to the ubvs5, so that a length of the ubvs5 may be changed from 4 to 5, and a length of the evs1 may be changed from 3 to 2. As a result, a new ubvs5 (i.e., a fusion pixel string 7) and a new evs1 (i.e., a fusion pixel string 8) are obtained. A prediction vector of a prediction string of the ubvs5 (also referred to as previous ubvs5) or the new ubvs5 may be (0, −2). A fusion prediction string of the fusion pixel string 7 may be determined based on pixels pointed by the prediction vector (0, −2). A fusion prediction string of the fusion pixel string 8 may be determined based on preset pixel values of a prediction string of the evs1. Further, a next pixel P in the evs1 may be transferred to the new ubvs5, so that a length of the new ubvs5 may be changed from 5 to 6, and a length of the new evs1 may be changed from 2 to 1. As a result, a fusion pixel string 9 and a fusion pixel string 10 are obtained. A fusion prediction string of the fusion pixel string 9 may be determined based on the pixels pointed by the prediction vector (0, −2). A fusion prediction string of the fusion pixel string 10 may be determined based on the preset pixel values of the prediction string of the evs1.

Figure 4D:
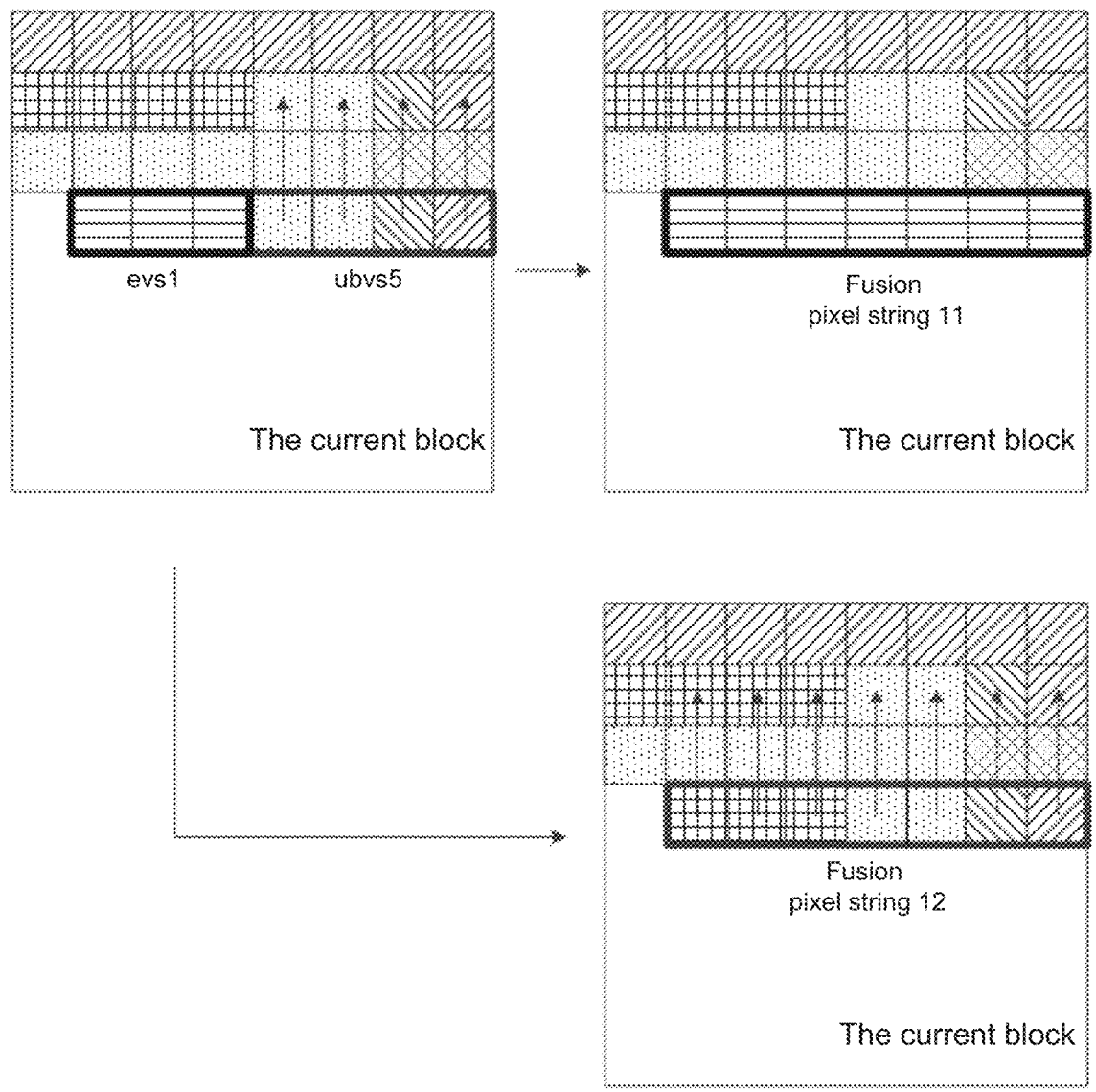
FIG. 4D is a flowchart illustrating an exemplary fusion process of a pair of target strings according to some embodiments of the present disclosure.

FIG. 4D is a flowchart illustrating an exemplary fusion process of a pair of target strings according to some embodiments of the present disclosure.

As shown in FIG. 4D, all pixels in the evs1 may be transferred to the ubvs5, so that the ubvs5 and the evs1 may be combined to obtain a new ubvs (i.e., a fusion pixel string 12) with a length of 7. The prediction vector of the prediction string of the ubvs5 may be used to predict the new ubvs (i.e., the fusion pixel string 12) to obtain a fusion prediction string of the fusion pixel string 12. Specifically, the prediction vector of the prediction string of the ubvs5 may be (0, −2), and the fusion prediction string of the fusion pixel string 12 may be determined based on pixels pointed by the prediction vector (0, −2).

In some embodiments, the evs1 may be used as the reference pixel string, and the ubvs5 may be used as the transfer pixel string. Starting from a pixel in the ubvs5 closest to the evs1, except for a pixel in the ubvs5 furthest from the evs1, other pixels in the ubvs5 may be transferred to the evs1 one by one and predicted based on the prediction vector of the prediction string of the evs1, which is equivalent to continuously increasing a length of the evs1 while continuously reducing a length of the ubvs5. In some embodiments, as shown in FIG. 4D, all pixels in the ubvs5 may be transferred to the evs1, so that the ubvs5 and the evs1 may be combined to obtain a new ubvs (i.e., a fusion pixel string 11) with a length of 7. The preset pixel values of the prediction string of the evs1 may be used to predict the new ubvs (i.e., the fusion pixel string 11) to obtain a fusion prediction string of the fusion pixel string 11.

In some embodiments, the pair of target strings may include two evs. One of the two evs may be used as the reference pixel string and the other of the two evs may be used as the transfer pixel string. The prediction string of the evs may include pixels with a same preset pixel value. All pixels in the transfer pixel string may be transferred to the reference pixel string, so that the two evs may be combined into an ubvs that is predicted based on different prediction vectors.

In the above embodiments, one of the pair of target strings is used as the reference pixel string and the other of the pair of target strings is used as the transfer pixel string. According to the fusion degree, several continuous pixels in the transfer pixel string close to the reference pixel string may be transferred to the reference pixel string. After the pixels are transferred, the reference pixel string may be designated as the first fusion pixel string, and the transfer pixel string may be designated as the second fusion pixel string. Further, the fusion prediction string of the first fusion pixel string may be determined based on a type of the prediction string of the prediction string of the reference pixel string, and the fusion prediction string of the second fusion pixel string may be determined based on a type of the prediction string of the transfer pixel string, which may improve the flexibility of the fusing of the pair of target strings and increase counts of fusion pixel strings and fusion prediction strings, thereby improving the accuracy of the subsequently determined target prediction string, reducing the bit cost, and improving the compression performance. As a result, the quality of subsequent video coding may be improved.

In some embodiments, an encoded block of the current block may be obtained, and then the encoded block may be decoded and reconstructed based on a type of a prediction string of a target prediction string in the encoded block.

In some embodiments, a syntax element expression may be obtained based on the target prediction string, and then the current block may be encoded based on the syntax element expression to obtain the encoded block of the current block. In some embodiments, if types of the prediction strings of a plurality of continuous target prediction strings in the current block is ubvs (that is, the plurality of continuous target prediction strings in the current block are ubvs), the syntax element expression may include a first syntax element, a second syntax element, and a third syntax element. The first syntax element may indicate prediction vectors of the target prediction strings whose types are ubvs. For the purposes of illustration, the first syntax element may be denoted as "ubvs_type". For example, in the case that preset vectors includes, but not limited to, (0, −1), (0, −2), (0, −3) . . . (0, −n), if the prediction vectors of the target prediction strings are (0, −1), the first syntax element "ubvs_type" may be set to 0. Similarly, if the prediction vectors of the target prediction strings are (0, −2), the first syntax element "ubvs_type" may be set to 1. The second syntax element may indicate a count of the consecutive target prediction strings in the current block. For the purposes of illustration, the second syntax element may be denoted as "run_num". The third syntax element may indicate the types of the prediction strings of the plurality of continuous target prediction strings in the current block. For the purposes of illustration, the third syntax element may be denoted as "is_evs_run". For example, when the types of the prediction strings of the plurality of consecutive target prediction strings in the current block are ubvs, the third syntax element may be set to 0 to indicate that the second syntax element "run_mum" indicates the count of consecutive ubvs.

In some embodiments, if that the types of the prediction strings of the plurality of continuous target prediction strings are ubvs is not allowed (that is, continuous ubvs are not allowed) (e.g., a plurality of continuous evs), the syntax element expression may include a first syntax element and a second syntax element. The first syntax element may indicate the prediction vectors of the target prediction strings whose type is ubvs. The second syntax element may indicate a count of the plurality of continuous target prediction strings whose types are not ubvs (e.g., the plurality of continuous evs).

In some embodiments, the syntax element expression may include a mode syntax element that indicates a selected prediction pattern. For the purposes of illustration, the mode syntax element may be denoted as "isc_cu_evs_ubvs_sub-mode_flag". The mode syntax element may indicate whether the determined prediction pattern is an ordinary string matching prediction pattern (also referred to as an ordinary string prediction pattern) or the evs_ubvs prediction pattern.

In some embodiments, for the current block, the syntax element expression may include a first matched string syntax element and a second matched string syntax element. The first matched string syntax element may indicate whether there is an evs in the current block. For the purposes of illustration, the first matched string syntax element may be denoted as "isc_evs_present_flag". The second matched string syntax element may indicate whether there is an unmatched string in the current block. For the purposes of illustration, the second matched string syntax element may be denoted as "isc_unmatched_pixel_str_present_flag".

In some embodiments, for the current string, for example, a ubvs, the syntax element expression may be set according to whether the continuous ubvs are allowed.

In some embodiments, for the current string (e.g., an evs), the syntax element expression may be set based on an index of a frequently-occurring pixel in the frequently-occurring pixel list corresponding to the evs and a length of the evs. Specifically, the length of the evs may be indicated by a syntax element "pixel_duplication_count_minus1". The syntax element "pixel_duplication_count_minus1" may indicate that the length of the evs minus 1. For example, if the length of the evs is 1, the syntax element "pixel_duplication_count_minus1" may be set to 0. If the length of the evs is 2, the syntax element "pixel_duplication_count_minus1" may be set to 1.

In some embodiments, for the current string (e.g., an unmatched string), the syntax element expression may be set according to pixel values of unmatched pixels in the unmatched string and a count of consecutive unmatched pixels in the unmatched string. Specifically, a length of the unmatched string may be indicated by a syntax element "isc_unmatched_pixel_num_minus1" and a syntax element "unmatched_pixel_max_length_minus1". The syntax element "isc_unmatched_pixel_num_minus1" may indicate that the length of the unmatched string minus 1. The syntax element "unmatched_pixel_max_length_minus1" may indicate that a maximum of the count of pixels in the unmatched string minus 1.

After the above syntax element expressions are obtained, the current block may be encoded based on the syntax element expressions to obtain the encoded block.

In some embodiments, if the type of the prediction string of the target prediction string is the evs, the target prediction string may be decoded and reconstructed directly. Specifically, the target prediction string may be decoded and reconstructed based on the syntax element corresponding to the target prediction string. For example, the length of the evs may be obtained based on the syntax element "pixel_duplication_count_minus1", and a pixel value of each pixel in the evs may be obtained based on a syntax element index.

In some embodiments, when the type of the prediction string of the target prediction string is the ubvs, a pixel row spacing corresponding to the prediction vector of the target prediction string and a count of pixel rows occupied by the target prediction string may be obtained. In such cases, several sub prediction strings of the target prediction string may be decoded and reconstructed in turn. In above way, when the type of the prediction string of the target prediction string is the ubvs and the count of pixel rows occupied by the target prediction string is greater than the pixel row spacing corresponding to the prediction vector of the target prediction string, the direct decoding of the target prediction string may result in that the decoding of pixels in the lower rows may refer to pixels in the upper rows in the current string. However, during the hardware circuit processing, the referenced pixels (e.g., the pixels in the upper rows) may not be able to complete decoding and reconstruction in time, which may not be conducive to the hardware implementation and affect decoding efficiency. Therefore, the target prediction string may be divided into the several sub prediction strings, and the count of pixel rows occupied by each sub prediction string may not be greater than the pixel row spacing. On this basis, the several sub prediction strings are decoded and reconstructed in turn, which is conducive to improving the decoding efficiency.

For example, the count of the pixel rows occupied by the ubvs is m, and the prediction vector corresponding to the ubvs is (0, −n) (that is, the corresponding pixel row spacing is n). If m exceeds n, the ubvs with m rows may be divided every n rows, so that ceil (m/n) sub prediction strings may be obtained by the dividing, wherein ceil indicates that m/n is increased to an integer when being a non-integer. Further, during the decoding and reconstruction, the sub prediction strings may be decoded and reconstructed in turn.

As another example, the count of the pixel rows occupied by the ubvs is 4, and the prediction vector corresponding to the ubvs is (0, −3) (that is, the corresponding pixel row spacing is 3). Therefore, the ubvs may be divided into 2 sub prediction strings (e.g., a first sub prediction string and a second sub prediction string). The first sub prediction string may occupy the first three rows of the ubvs, that is, a count of pixel rows in the first sub prediction string is 3. The second sub prediction string may occupy a last line of the ubvs, that is, a count of pixel rows in the second sub prediction string is 1. During the decoding and reconstruction, the first sub prediction string may be decoded and reconstructed first, and then the second sub prediction string may be decoded and reconstructed.

In some embodiments, the current string may be encoded based on the type of the current string and the frequently-occurring pixel list to obtain a code stream of the current block. Specifically, related syntax elements may be set. For example, the syntax element "isc_cu_evs_ubvs_submode_flag" may be transmitted to indicate that whether the evs_ubvs prediction pattern or the ordinary SP prediction pattern is used to predict. Further, a syntax element may be transmitted to indicate that whether the current string is evs, unmatched pixels, or ubvs. For the current block, a syntax element "isc_evs_present_flag" may be transmitted to indicate whether there is an evs in the current block, and then a syntax element "isc_unmatched_pixel_str_present_flag" may be transmitted to indicate whether there are unmatched pixels in the current block. For the current string, if the current string is an evs, an index of a frequently-occurring pixel corresponding to the evs in a Srb list and a length of the current string may be transmitted. The length of the current string may involve a syntax element "pixel_duplication_count_minus1". If the frequently-occurring pixel corresponding to the evs is a new frequently-occurring pixel, a pixel value of the new frequently-occurring pixel may be transmitted. If the current string is an ubvs, a syntax element may be needed to indicate a count of continuous evs or unmatched strings. If the count is 0, the current string may be neither evs nor unmatched string, that is, the current string may be an ubvs. In such cases, a length of the ubvs may be transmitted. The length of the ubvs may involve a syntax element "str_length_minus1N". If the current string is unmatched pixels, pixel values of the unmatched pixels and a count of consecutive unmatched pixels in the current string may need to be transmitted. A length of the unmatched pixels may involve syntax elements "sc_unmatched_pixel_num_minus1" and "unmatched_pixel_max_length_minus1". The above syntax elements involved by the length of the current string are shown in Table (2).

TABLE 2

| Syntax element | Description |
| --- | --- |
| pixel_duplication_count_minus1 | The syntax element indicates that the length of an evs minus 1. |
| str_length_minus1[i] | The syntax element indicates that the length of an ubvs minus 1. |
| isc_unmatched_pixel_num_minus1 | The syntax element indicates that the length of an unmatched string minus 1. |
| unmatched_pixel_max_length_minus1 | The syntax element indicates that the maximum of the count of pixels in an unmatched string minus 1. |

In some embodiments, in order to enable the decoder to construct the Srb list, the encoder may need to transmit three values "num_of_reused_pv", "num_of_new_pv", and "prev_pv_not_reused_run". The "num_of_reused_pv" may indicate a count of frequently-occurring pixels in a historical frequently-occurring pixel list extracted by the current block. The "prev_pv_not_reused_run" may indicate that when the historical frequently-occurring pixel list is scanned from the beginning, one historical frequently-occurring pixel may appear every few indexes, and the decoder may take the historical frequently-occurring pixel out and put it into the frequently-occurring pixel list. The "num_of_new_pv" may indicate a count of new frequently-occurring pixels in the current block. Differential coding may be provided when an index of a frequently-occurring pixel corresponding to an evs is encoded and transmitted. That is, the index corresponding to current evs is not transmitted directly, and a difference between the index corresponding to a current evs and an index corresponding to a previous evs of the current evs may be determined. Further, the difference between the index corresponding to the current evs and an index corresponding to the previous evs of the current evs may be transmitted. If the difference between the index corresponding to the current evs and an index corresponding to the previous evs of the current evs is less than 0, the difference needs to add the "num_of_reused_pv" and a count of new frequently-occurring pixels that have been encoded to ensure that the transmitted value is not a negative number.

The encoded block may be obtained based on the above embodiments, thereby improving the quality of the video coding. Further, the encoded block may be decoded and reconstructed based on the type of the prediction string of the target prediction string in the encoded block, that is, the encoded block may be decoded and reconstructed by distinguishing the type of the prediction string of the target prediction string, thereby improving the decoding quality.

In some embodiments, the video coding and decoding method in the present disclosure may be applied to Audio Video Coding Standard 3 (AVS3). The AVS3 is a third generation video coding standard formulated by China AVS working group and suitable for a variety of application scenarios such as Ultra HD TV Broadcasting, virtual reality (VR), and video monitoring, or the like.

In some embodiments, the video coding and decoding method in the present disclosure may be applied to a screen content scene (SCC) (e.g., encoding images generated by a computer), a natural image scene (e.g., encoding natural images), and a mixed scene of the SCC and the natural image scene.

Figure 5:
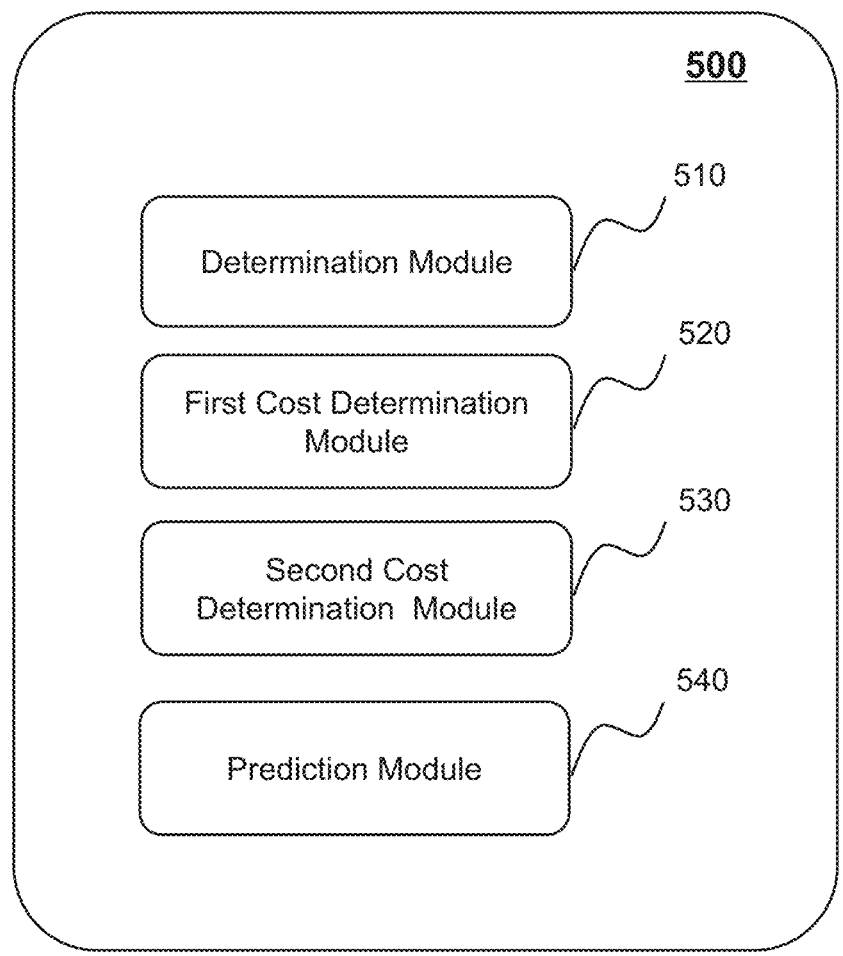
FIG. 5 is a block diagram illustrating an exemplary video processing system according to some embodiments of the present disclosure.

FIG. 5 is a block diagram illustrating an exemplary video processing system according to some embodiments of the present disclosure. As shown in FIG. 5, a system 500 may include a determination module 510, a first cost determination module 520, a second cost determination module 530, and a prediction module 540.

The determination module 510 may be configured to determine a current string in a coding unit (CU) of an image frame. More descriptions regarding the determining of the current string may be found elsewhere in the present disclosure, for example, operation 310 in FIG. 3 and relevant descriptions thereof.

The first cost determination module 520 may be configured to determine a first cost based on pixels with a same pixel value in the current string. More descriptions regarding the determining of the first cost may be found elsewhere in the present disclosure, for example, operation 320 in FIG. 3 and relevant descriptions thereof.

The second cost determination module 530 may be configured to determine a second cost based on one or more strings that are located above the current string. More descriptions regarding the determining of the second cost may be found elsewhere in the present disclosure, for example, operation 330 in FIG. 3 and relevant descriptions thereof.

The prediction module 540 may be configured to determine a prediction string of the current string based on the first cost and the second cost. More descriptions regarding the determining of the prediction string of the current string may be found elsewhere in the present disclosure, for example, operation 340 in FIG. 3 and relevant descriptions thereof.

In some embodiments, the system 500 may further include a fusion module (not shown). The fusion module may be configured to designate two adjacent strings among strings that have been predicted in the CU and satisfy a condition as a pair of target strings. The fusion module may be configured to determine one or more fusion prediction strings by fusing the pair of target strings based on prediction strings of the pair of target strings and a fusion degree, the fusion degree including at least one of complete fusion or incomplete fusion. The fusion module may be further configured to determine one or more target prediction strings of the pair of target strings based on prediction costs of the prediction strings of the pair of target strings and prediction costs of the one or more fusion prediction strings. More descriptions regarding the fusion of the pair of target strings may be found elsewhere in the present disclosure, for example, FIGS. 4A-4D and relevant descriptions thereof.

In some embodiments, the system 500 may further include an encoding module (not shown). The encoding module may be configured to obtain an encoded string corresponding to the current string. The encoding module may be further configured to encode the encoded string based on the prediction string of the current string. Specifically, in response to that a type of the prediction string is ubvs, the encoding module may be configured to obtain a pixel row spacing corresponding to a prediction vector of the prediction string and a count of pixel rows occupied by the prediction string. In response to that the count of pixel rows occupied by the prediction string is greater than the pixel row spacing corresponding to the prediction vector of the prediction string, the encoding module may be configured to divide the prediction string into a plurality of sub prediction strings. A count of pixel rows occupied by each of the plurality of sub prediction strings may be greater than the pixel row spacing. Further, the encoding module may be configured to decode the plurality of sub prediction strings in turn.

The modules in the video processing system 500 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, two or more of the modules may be combined as a single module, and any one of the modules may be divided into two or more units.

Figure 6:
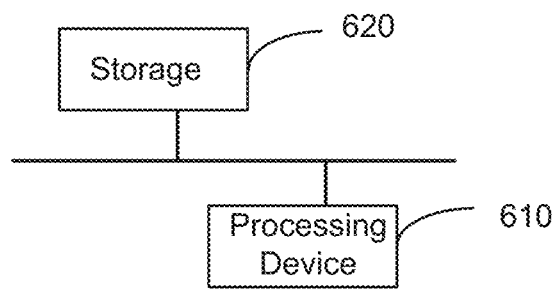
FIG. 6 is a schematic diagram illustrating an exemplary video processing device according to some embodiments of the present disclosure.

FIG. 6 is a schematic diagram illustrating an exemplary video processing device according to some embodiments of the present disclosure. In some embodiments, the video processing system 100 and/or the video processing system 500 may be implemented by software and/or hardware, and/or may be integrated into the video processing device 600.

As shown in FIG. 6, the video processing device 600 may include a processing device 610 (also referred to as a processor). The processing device may be configured to process information and/or data relating to the video processing to perform one or more functions described in the present disclosure. For example, the processing device 610 may be configured to implement any one of the embodiments or any combination thereof in the present disclosure.

In some embodiments, the processing device 610 may include a central processing unit (CPU). In some embodiments, the processing device 610 may include an integrated circuit chip configured to process signals. In some embodiments, the processing device 610 may include a general-purpose processor, a digital signal processor (DSP), an application specific integrated circuit (ASIC), a field programmable gate array (FPGA), other programmable logic device, a discrete gate, a transistor logic device, a discrete hardware component, or the like, or any combination thereof. The general-purpose processor may include a microprocessor. In some embodiments, the processing device 610 may include any conventional processor.

In some embodiments, the video processing device 600 may include a storage 620. The storage 620 may be configured to store instructions and/or data required for operations of the processing device 610. In some embodiments, the storage 620 may include a medium that may store program codes, such as a U disk, a mobile hard disk, a read-only memory (ROM), a random access memory (RAM), a magnetic disk, an optical disk, or the like, or any combination thereof. In some embodiments, the storage 620 may include terminal devices such as a computer, a server, a mobile phone, a tablet, or the like, or any combination thereof.

Figure 7:
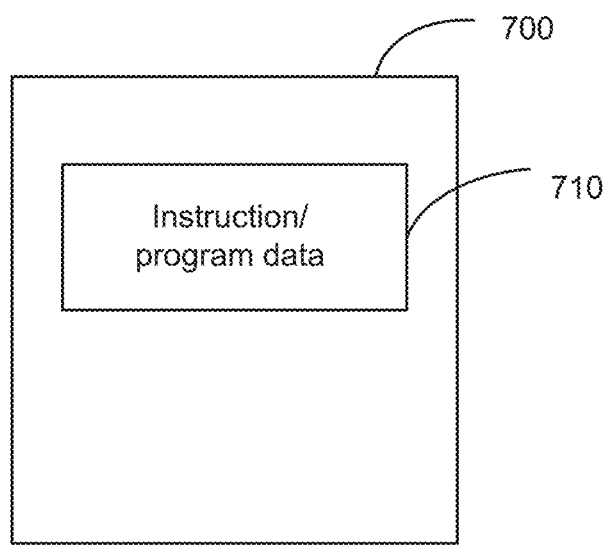
FIG. 7 is a schematic diagram illustrating an exemplary computer-readable storage medium according to some embodiments of the present disclosure.

FIG. 7 is a schematic diagram illustrating an exemplary computer-readable storage medium according to some embodiments of the present disclosure. The computer-readable storage medium 700 may be configured to store instruction/program data 710. When the instruction/program data 710 is executed, any one of the embodiments of the video processing method may be implemented. In some embodiments, the instruction/program data 710 may be in a form of a program file and stored in the storage 620 in a form of a software product. A computer device (e.g., the video processing device 600, the video processing system 100, the video processing system 500) personal computer, a server, or a network device, etc.) or a processor may perform all or part of the operations of the embodiments of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method, comprising:
   determining a current string in a coding unit (CU) of an image frame, the current string including one or more pixels;
   for each of pixels with a same pixel value in the current string, determining differences between the pixel and each of frequently-occurring pixels in a frequently-occurring pixel candidate list;
   determining a smallest difference among the differences corresponding to the pixels with the same pixel value in the current string as a first cost;
   comparing the current string with one or more strings that are pointed to by a plurality of preset vectors, a count of the one or more strings being larger than 1;
   determining, based on the comparison, a target string from the one or more strings, the target string having a smallest prediction cost;
   designating the cost of the target string as a second cost; and determining a string, corresponding to the smaller of the first cost and the second cost, as a prediction string of the current string.

2. The method of claim 1, further including:
designating two adjacent strings among strings that have been predicted in the CU and satisfy a condition as a pair of target strings, wherein the condition includes that prediction strings of the adjacent strings do not include an unmatched string, one of the pair of target strings is used as a reference pixel string, and the other of the pair of target strings is used as a transfer pixel string;
determining one or more fusion prediction strings by fusing the pair of target strings based on prediction strings of the pair of target strings and a fusion degree, the fusion degree including at least one of complete fusion or incomplete fusion, wherein the complete fusion refers to that all pixels in the transfer pixel string are transferred to the reference pixel string; and
determining one or more target prediction strings of the pair of target strings based on prediction costs of the prediction strings of the pair of target strings and prediction costs of the one or more fusion prediction strings.

3. The method of claim 1, wherein determining the current string by setting a length of the current string being an integer multiple of a reference value, the reference value being a natural number larger than 1.

4. The method of claim 1, further including:
obtaining an encoded string corresponding to the current string; and
encoding the encoded string based on the prediction string of the current string, wherein the encoding the encoded string based on the prediction string of the current string includes:
obtaining, in response to that a type of the prediction string is a unit basis vector string (ubvs), a pixel row spacing corresponding to a prediction vector of the prediction string and a count of pixel rows occupied by the prediction string;
dividing, in response to that the count of pixel rows occupied by the prediction string is greater than the pixel row spacing corresponding to the prediction vector of the prediction string, the prediction string into a plurality of sub prediction strings, a count of pixel rows occupied by each of the plurality of sub prediction strings being not greater than the pixel row spacing; and
decoding the plurality of sub prediction strings in turn.

5. A system, comprising:
at least one storage device including a set of instructions; and
at least one processor in communication with the at least one storage device, wherein when executing the set of instructions, the at least one processor is directed to perform operations including:
determining a current string in a coding unit (CU) of an image frame, the current string including one or more pixels;
for each of pixels with a same pixel value in the current string, determining differences between the pixel and each of frequently-occurring pixels in a frequently-occurring pixel candidate list;
determining a smallest difference among the differences corresponding to the pixels with the same pixel value in the current string as a first cost;
comparing the current string with one or more strings that are pointed to by a plurality of preset vectors, a count of the one or more strings being larger than 1;
determining, based on the comparison, a target string from the one or more strings, the target string having a smallest prediction cost;
designating the cost of the target string as a second cost; and
determining a string, corresponding to the smaller of the first cost and the second cost, as a prediction string of the current string.

6. The system of claim 5, wherein the count of the one or more strings is obtained by mapping a height of the CU based on a preset mapping relationship, the preset mapping relationship including a multiple linear relationship or a nonlinear relationship.

7. The system of claim 5, the operations further include:
designating two adjacent strings among strings that have been predicted in the CU and satisfy a condition as a pair of target strings, wherein the condition includes that prediction strings of the adjacent strings do not include an unmatched string, one of the pair of target strings is used as a reference pixel string, and the other of the pair of target strings is used as a transfer pixel string;
determining one or more fusion prediction strings by fusing the pair of target strings based on prediction strings of the pair of target strings and a fusion degree, the fusion degree including at least one of complete fusion or incomplete fusion, wherein the complete fusion refers to that all pixels in the transfer pixel string are transferred to the reference pixel string; and
determining one or more target prediction strings of the pair of target strings based on prediction costs of the prediction strings of the pair of target strings and prediction costs of the one or more fusion prediction strings.

8. The system of claim 7, wherein the determining the one or more fusion prediction strings by fusing the pair of target strings based on the prediction strings of the pair of target strings and the fusion degree includes:
in response to types of the prediction strings of the pair of target strings being the same, determining one fusion prediction string by fusing the pair of target strings based on the complete fusion.

9. The system of claim 7, wherein the determining the one or more fusion prediction strings by fusing the pair of target strings based on the prediction strings of the pair of target strings and the fusion degree includes:
in response to types of the prediction strings of the pair of target strings being different, determining two fusion prediction strings by fusing the pair of target strings based on the incomplete fusion.

10. The system of claim 5, wherein determining the current string by setting a length of the current string being an integer multiple of a reference value, the reference value being a natural number larger than 1.

11. The system of claim 10, wherein the determining the current string includes:
determining the current string by increasing the length of the current string to the integer multiple of the reference value.

12. The system of claim 10, wherein the determining the current string includes:
determining the current string by reducing the length of the current string to the integer multiple of the reference value.

13. The system of claim 10, wherein the determining the current string includes:
  determining the current string based on a style of the current string, the style including one of unmatched pixels, an equal value string (evs), and a unit basis vector string (ubvs) determined based on the plurality of preset vectors.

14. The system of claim 13, wherein
the style of the current string is the unmatched pixels, and the determining the current string based on the style of the current string includes:
determining the current string by increasing unmatched pixels in the current string.

15. The system of claim 13, wherein
the style of the current string is the evs or the ubvs determined based on the plurality of preset vectors, and the determining the current string based on the style of the current string includes:
determining the current string by reducing a length of the evs or the ubvs to the integer multiple of the reference value.

16. The system of claim 5, the operations further include:
obtaining an encoded string corresponding to the current string; and
encoding the encoded string based on the prediction string of the current string, wherein the encoding the encoded string based on the prediction string of the current string includes:
  obtaining, in response to that a type of the prediction string is a unit basis vector string (ubvs), a pixel row spacing corresponding to a prediction vector of the prediction string and a count of pixel rows occupied by the prediction string;
  dividing, in response to that the count of pixel rows occupied by the prediction string is greater than the pixel row spacing corresponding to the prediction vector of the prediction string, the prediction string into a plurality of sub prediction strings, a count of pixel rows occupied by each of the plurality of sub prediction strings being not greater than the pixel row spacing; and
  decoding the plurality of sub prediction strings in turn.

17. A non-transitory computer readable medium, comprising executable instructions that, when executed by at least one processor, direct the at least one processor to perform a method, the method comprising:
  determining a current string in a coding unit (CU) of an image frame, the current string including one or more pixels;
  for each of pixels with a same pixel value in the current string, determining differences between the pixel and each of frequently-occurring pixels in a frequently-occurring pixel candidate list;
  determining a smallest difference among the differences corresponding to the pixels with the same pixel value in the current string as a first cost;
  comparing the current string with one or more strings that are pointed to by a plurality of preset vectors, a count of the one or more strings being larger than 1;
  determining, based on the comparison, a target string from the one or more strings, the target string having a smallest prediction cost;
  designating the cost of the target string as a second cost; and
  determining a string, corresponding to the smaller of the first cost and the second cost, as a prediction string of the current string.

18. The method of claim 2, wherein the determining the one or more fusion prediction strings by fusing the pair of target strings based on the prediction strings of the pair of target strings and the fusion degree includes:
  in response to types of the prediction strings of the pair of target strings being the same, determining one fusion prediction string by fusing the pair of target strings based on the complete fusion, wherein the types of the prediction string include one of unmatched pixels, an equal value string (evs), and a unit basis vector string (ubvs).

19. The method of claim 18, wherein the determining the one or more fusion prediction strings by fusing the pair of target strings based on the prediction strings of the pair of target strings and the fusion degree further includes:
  in response to the types of the prediction strings of the pair of target strings being different, determining two fusion prediction strings by fusing the pair of target strings based on the incomplete fusion.

20. The method of claim 1, wherein the count of the one or more strings is obtained by mapping a height of the CU based on a preset mapping relationship, the preset mapping relationship including a multiple linear relationship or a nonlinear relationship.

* * * * *